United States Patent
Sato

(10) Patent No.: US 12,205,304 B2
(45) Date of Patent: Jan. 21, 2025

(54) IMAGE PROCESSING APPARATUS, IMAGE PROCESSING METHOD AND COMPUTER-READABLE MEDIUM

(71) Applicant: Socionext Inc., Kanagawa (JP)

(72) Inventor: Hidehiko Sato, Yokohama (JP)

(73) Assignee: SOCIONEXT INC., Kanagawa (JP)

(\*) Notice: Subject to any disclaimer, the term of this patent is extended or adjusted under 35 U.S.C. 154(b) by 353 days.

(21) Appl. No.: 17/834,535

(22) Filed: Jun. 7, 2022

(65) Prior Publication Data

US 2022/0301191 A1 Sep. 22, 2022

Related U.S. Application Data

(63) Continuation of application No. PCT/JP2019/048362, filed on Dec. 10, 2019.

(51) Int. Cl.
*G06K 9/00* (2022.01)
*G06T 5/50* (2006.01)
*G06T 5/70* (2024.01)
*G06T 7/246* (2017.01)

(52) U.S. Cl.
CPC ............... *G06T 7/248* (2017.01); *G06T 5/50* (2013.01); *G06T 5/70* (2024.01); *G06T 2207/10016* (2013.01); *G06T 2207/20224* (2013.01)

(58) Field of Classification Search
None
See application file for complete search history.

(56) References Cited

U.S. PATENT DOCUMENTS

| | | | |
|---|---|---|---|
| 2006/0244866 A1 | 11/2006 | Kishida | |
| 2015/0294158 A1* | 10/2015 | Collins | G06V 20/52 382/103 |
| 2018/0115752 A1 | 4/2018 | Sato | |

FOREIGN PATENT DOCUMENTS

| | | |
|---|---|---|
| JP | 2006-237716 A | 9/2006 |
| JP | 2006-260049 A | 9/2006 |
| JP | 2007-036743 A | 2/2007 |
| JP | 2013-258445 A | 12/2013 |
| JP | 2016-213628 A | 12/2016 |

OTHER PUBLICATIONS

International Search Report (ISR) dated Mar. 3, 2020 issued in International Patent Application No. PCT/JP2019/048362, with English translation.

\* cited by examiner

*Primary Examiner* — S J Park
(74) *Attorney, Agent, or Firm* — Rimon P.C.

(57) ABSTRACT

An image processing apparatus includes a hardware processor configured to function as: a first generation unit that, from a first frame image and a second frame image in a past frame immediately successive to the first frame image, generates a first motion map showing a presence region of a moving object; a second generation unit that generates a moving object passage map showing a moving object passage region, by subtracting the first motion map from a past map image showing a presence region of the moving object included in a past frame image; a third generation unit that generates a second motion map by integrating the first motion map and the moving object passage map multiplied by a first value; and an adjustment unit that, based on the second motion map, adjusts a parameter related to noise reduction processing of the first frame image and the second frame image.

11 Claims, 14 Drawing Sheets

IMAGE PROCESSING APPARATUS, IMAGE PROCESSING METHOD AND COMPUTER-READABLE MEDIUM

CROSS-REFERENCE TO RELATED APPLICATIONS

This application is a continuation of International Application No. PCT/JP2019/048362, filed on Dec. 10, 2019, the entire contents of which are incorporated herein by reference.

FIELD

The present invention relates to an image processing apparatus, an image processing method and a computer-readable medium.

BACKGROUND

Hitherto, regarding a noise reduction technology for a plurality of frame images of a moving image or the like, there has been known an apparatus that performs three-dimensional noise reduction (3DNR) processing by using frame images for three frames successive in chronological order (for example, refer to Japanese Patent Application Publication No. 2006-237716).

However, hitherto, in such a case where a moving object is present in the frame images, there has been a possibility that there may occur a noise (an afterimage noise) in which the moving object leaves a trail in a region passed thereby. Therefore, hitherto, it has been difficult to provide frame images in which the afterimage noise is reduced.

Therefore, there is a need for reducing the noise that occurs in the region through which the moving object has passed.

SUMMARY

In an aspect, an image processing apparatus disclosed by the present application includes a hardware processor configured to function as a first generation unit, a second generation unit, a third generation unit, and an adjustment unit. The first generation unit generates, from a first frame image and a second frame image among a plurality of frame images successively input, a first motion map showing a presence region of a moving object included in the frame images. The second frame image is in a past frame immediately successive to the first frame image in chronological order. The second generation unit generates a moving object passage map showing a moving object passage region through which the moving object has passed, by subtracting the first motion map from a past map image showing a presence region of the moving object included in a past frame image before the first frame image. The third generation unit generates a second motion map by integrating the first motion map and the moving object passage map multiplied by a first value. The adjustment unit adjusts, based on the second motion map, a parameter related to noise reduction processing of the first frame image and the second frame image.

DETAILED DESCRIPTION

A detailed description will be given below of embodiments of an image processing apparatus, an image processing method and a program, which are disclosed by the present application, with reference to the accompanying drawings. Note that the following embodiments do not limit the disclosed technology. Then, it is possible to appropriately combine the respective embodiments with one another within the range of not causing a contradiction in processing details.

First Embodiment

Figure 1:
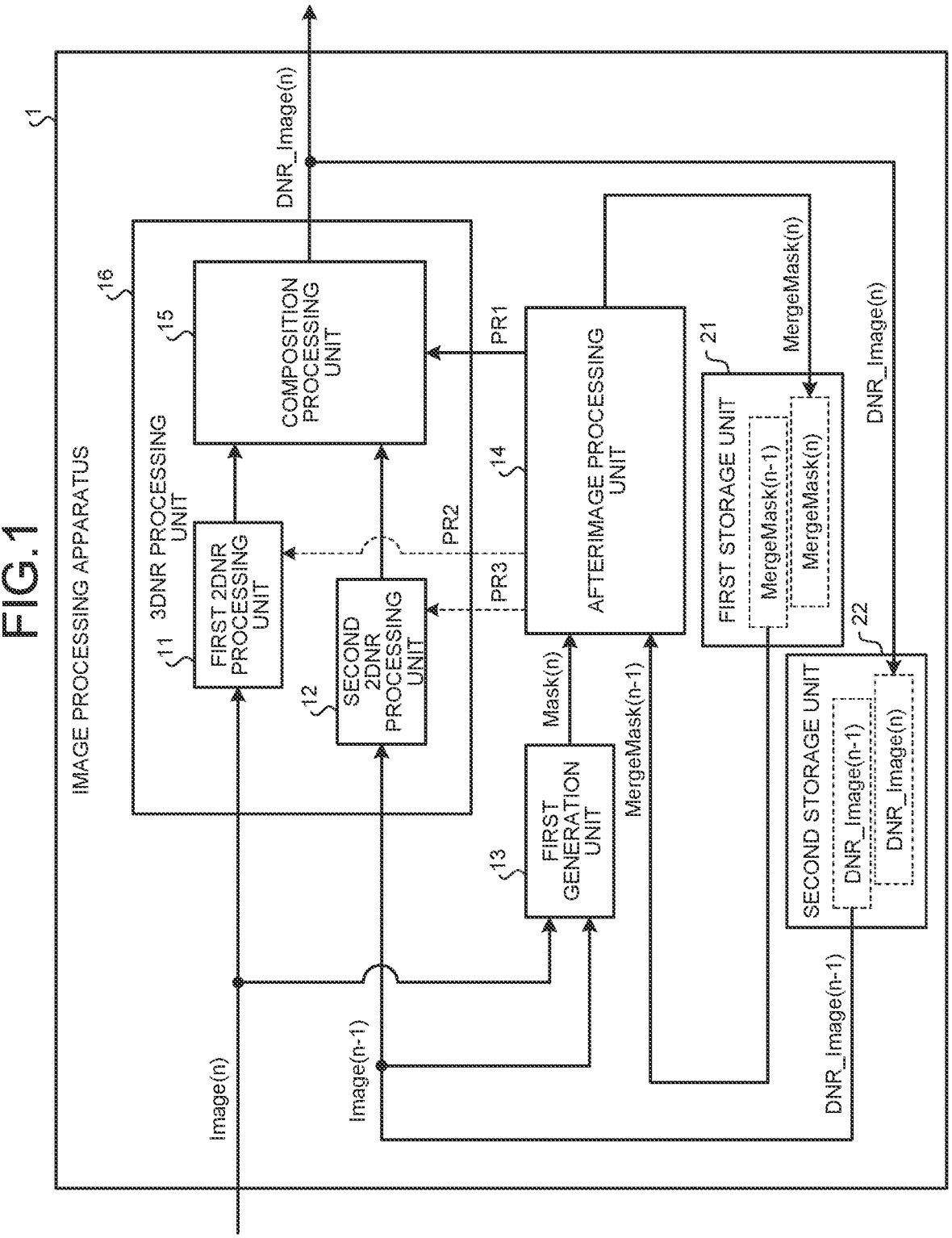
FIG. 1 is a diagram illustrating an example of a configuration of an image processing apparatus according to a first embodiment.

FIG. 1 is a diagram illustrating an example of a configuration of an image processing apparatus 1 according to the present embodiment. The image processing apparatus 1 is an image processing apparatus capable of sequentially performing pieces of three-dimensional noise reduction (3DNR) processing for a plurality of frame images which are successively input. For example, the image processing apparatus 1 performs the three-dimensional noise reduction processing for a video composed of a plurality of frame images, thereby outputting a video in which noises included in the frame images are reduced.

Hereinafter, among the frame images input to the image processing apparatus 1, a frame image (a current frame) latest in chronological order is represented as a frame image Image(n). Further, such an image of a frame in the past or the future with respect to the current frame is represented on the basis of an index "n" of the current frame. For example, an image of a frame that is one frame before the current frame is represented as Image(n−1). For example, an image of a frame that is one frame later the current frame is represented as Image(n+1).

As illustrated in FIG. 1, the image processing apparatus 1 includes: a first 2DNR processing unit 11, a second 2DNR processing unit 12, a first generation unit 13, an afterimage processing unit 14, and a composition processing unit 15.

Herein, the first 2DNR processing unit 11 and the second 2DNR processing unit 12 are examples of a two-dimensional noise reduction processing unit. The first generation unit 13 is an example of a first generation unit. The composition processing unit 15 is an example of a composition processing unit. Further, the first 2DNR processing unit 11, the second 2DNR processing unit 12 and the composition processing unit 15 function as a 3DNR processing unit 16 that is an example of a three-dimensional noise reduction processing unit.

Note that a part or all of the first 2DNR processing unit 11, the second 2DNR processing unit 12, the first generation unit 13, the afterimage processing unit 14 and the composition processing unit 15 may be achieved, for example, a hardware configuration such as a dedicated circuit. Further, a part or all of the first 2DNR processing unit 11, the second 2DNR processing unit 12, the first generation unit 13, the afterimage processing unit 14 and the composition processing unit 15 may be achieved by a software configuration made by cooperation between a program and a processor provided in a computer such as a microcomputer. Examples of the processor include a central processing unit (CPU), a digital signal processor (DSP), a field programmable gate array (FPGA), a graphics processing unit (GPU) and the like.

The image processing apparatus 1 further includes a first storage unit 21, and a second storage unit 22. Each of the first storage unit 21 and the second storage unit 22 is, for example, a storage device such as a synchronous dynamic random access memory (SDRAM). Note that the first storage unit 21 and the second storage unit 22 may be achieved by individual storage devices, or may be achieved by two storage areas provided in the same storage device.

The first 2DNR processing unit 11 executes two-dimensional noise reduction (2DNR) processing for the frame image Image(n) of the current frame. For example, the first 2DNR processing unit 11 executes smoothing processing for pixels, which constitute the Image(n), in units of pixel blocks of "3×3," "5×5," and "7×7." Herein, the frame image Image(n) is, for example, a color image with 24 bits or more, in which values of the respective color pixels of RGB or YCbCr (luminance and saturation) are represented by multiple values of 8 bits or more (10 bits, 12 bits and the like).

The second 2DNR processing unit 12 executes 2DNR processing, which is similar to that in the first 2DNR processing unit 11, for the frame image Image(n−1) whose frame is one frame before the current frame. Herein, the frame image Image(n−1) corresponds to a frame image DNR_Image(n−1) already subjected to three-dimensional noise reduction (3DNR) processing to be described later, the frame image DNR_Image(n−1) being generated on the basis of the preceding frame image Image(n−1) and frame image Image(n−2). The frame image DNR_Image(n−1) is, for example, a color image of 24 bits or more, in which values of the respective color pixels of RGB or YCbCr (luminance and saturation) are represented by multiple values of 8 bits or more (10 bits, 12 bits and the like).

In the present embodiment, the first 2DNR processing unit 11 sends a detection signal of detection of the frame image Image(n) to the second 2DNR processing unit 12. The second 2DNR processing unit 12 receives the detection signal, and reads out the frame image DNR_Image(n−1) from the second storage unit 22. Note that a readout method of the frame image DNR_Image(n−1) is not limited to this. For example, the inside or outside of the image processing apparatus 1 may be provided with an input/output control unit (not illustrated) that collectively controls input timing of the frame image Image(n), readout timing of the frame image DNR_Image(n−1) from the second storage unit 22, and the like.

On the basis of the frame image Image(n) and the frame image Image(n−1), the first generation unit 13 generates a first motion map Mask(n) that shows a presence region of a moving object included between both of the frame images. Herein, the frame image Image(n−1) corresponds to the frame image DNR_Image(n−1) already subjected to the three-dimensional noise reduction (3DNR) processing to be described later, the frame image DNR_Image(n−1) being generated on the basis of the preceding frame image Image(n−1) and frame image Image(n−2).

In the present embodiment, upon detecting the frame image Image(n), the first generation unit 13 reads out the frame image DNR_Image(n−1) from the second storage unit 22. Note that the readout method of the frame image DNR_Image(n−1) is not limited to this. For example, the inside or outside of the image processing apparatus 1 may be provided with the input/output control unit (not illustrated) that collectively controls the input timing of the frame image Image(n), the readout timing of the frame image DNR_Image(n−1) from the second storage unit 22, and the like.

The first generation unit 13 compares the frame image Image(n) and the frame image Image(n−1) with each other, and generates, as the first motion map Mask(n), an image in which differences between values of pixels located on the same pixel position are represented by binary values or multiple values of 8 bits and the like.

For example, the first generation unit 13 generates such a first motion map Mask(n) as a black-and-white image in which pixel positions with inter-pixel value differences smaller than a threshold value are represented by 0 and pixel positions with inter-pixel value differences equal to or larger than the threshold value are represented by 1. Moreover, for example, the first generation unit 13 generates the first motion map Mask(n) as the monochrome image in which the pixel position of each pixel is represented by a multiple value of 0 to 255 or the like according to such an inter-pixel difference. Note that the first motion map Mask(n) is not limited to the black-and-white image or the monochrome image, and may be a color image having color components of RGB and the like.

The first motion map Mask(n) thus generated shows pixel positions of such regions where the moving object is present in the frame image Image(n) and the frame image Image(n−1). Moreover, since the first motion map Mask(n) is a black-and-white image or a monochrome image, a bit depth of the first motion map Mask(n) becomes smaller than bit depths of the original frame image Image(n) and frame image Image(n−1). That is, in the afterimage processing unit 14 on the subsequent stage to the first generation unit 13, the processing can be advanced on the basis of the first motion map Mask(n) in which the bit depth is reduced, and accordingly, a memory capacity and a processing load, which are related to the processing, can be suppressed.

To the afterimage processing unit 14, there are input: the first motion map Mask(n) related to the current frame; and a second motion map MergeMask(n−1) to be described later, which is related to the past frame that is one frame before the current frame. Specifically, upon detecting the first motion map Mask(n) from the first generation unit 13, the afterimage processing unit 14 reads out the second motion map MergeMask(n−1) to be described later from the first storage unit 21. Note that a readout method of the second motion map MergeMask(n−1) is not limited to this. For example, the inside or outside of the image processing apparatus 1 may be provided with an input/output control unit (not illustrated) that collectively controls input timing of the first motion map Mask(n), readout timing of the second motion map MergeMask(n−1) from the first storage unit 21, and the like.

On the basis of the first motion map Mask(n) and the second motion map MergeMask(n−1) to be described later, the afterimage processing unit 14 extracts a region (a moving object passage region) through which the moving object has passed, and generates a second motion map MergeMask(n) related to the current frame. Then, on the basis of the second motion map MergeMask(n), the afterimage processing unit 14 adjusts a parameter related to 3DNR processing of the 3DNR processing unit 16.

Figure 2:
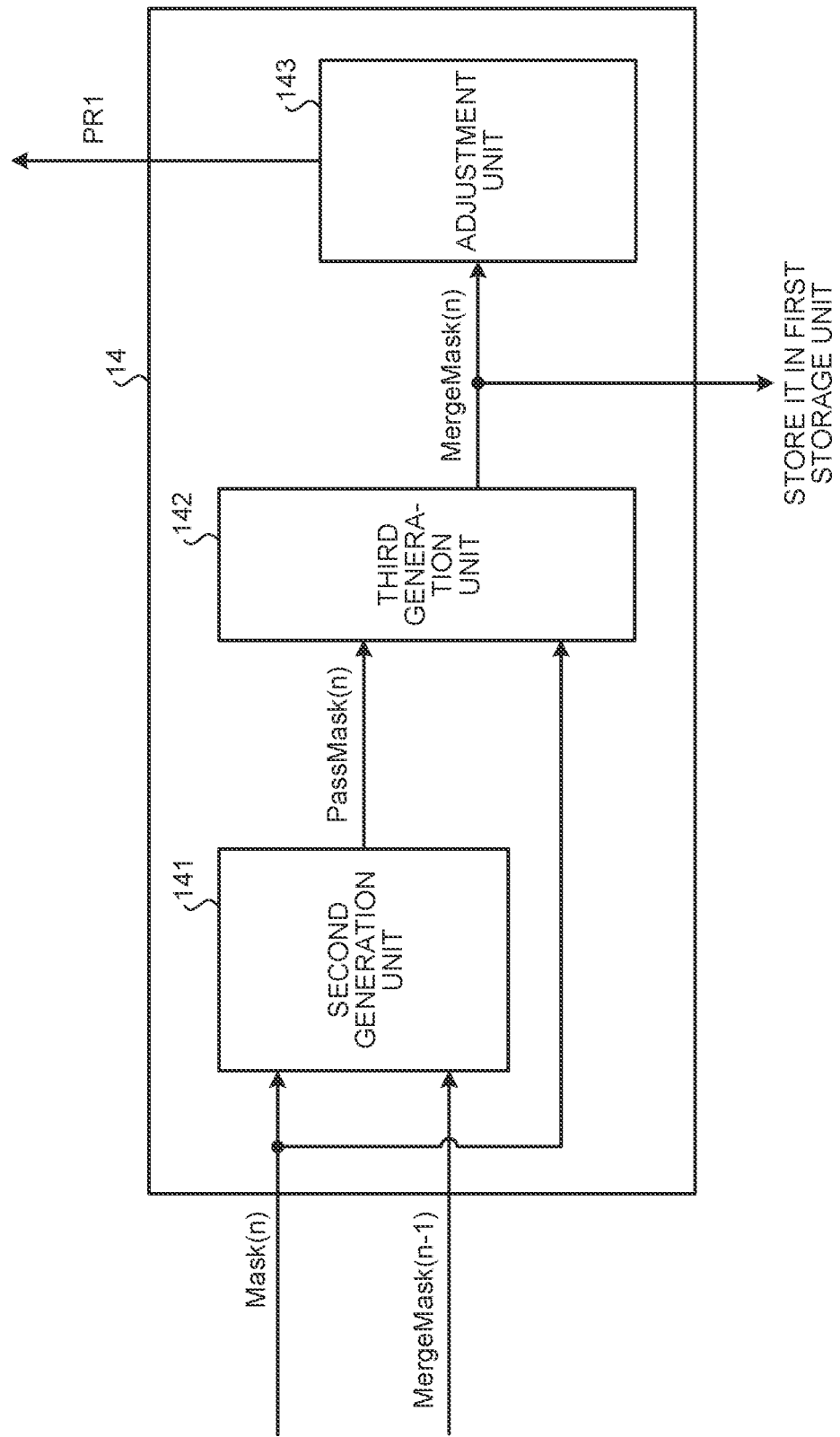
FIG. 2 is a diagram illustrating an example of functions of an afterimage processing unit of the first embodiment.

Specifically, the afterimage processing unit 14 has a functional configuration illustrated in FIG. 2 in order to achieve the above-mentioned functions. Herein, FIG. 2 is a diagram illustrating the functions of the afterimage processing unit 14.

As illustrated in FIG. 2, the afterimage processing unit 14 includes a second generation unit 141, a third generation unit 142, and an adjustment unit 143. Herein, the second generation unit 141 is an example of a second generation unit. The third generation unit 142 is an example of a third generation unit.

The second generation unit 141 subtracts the first motion map Mask(n) from the second motion map MergeMask(n−1), thereby generating a moving object passage map PassMask(n) that shows a moving object passage region through which the moving object has passed. Specifically, from values of the respective pixels which constitute the second motion map MergeMask(n−1), the second generation unit 141 subtracts values of the pixels of the first motion map Mask(n), which are located at the same pixel positions as those of these pixels. Then, the second generation unit 141 determines it is the moving object passage region when a value as a subtraction result is positive, and generates a moving object passage map PassMask(n) in which such values corresponding to the subtraction results are associated with the respective pixel positions. Herein, values corresponding to the subtraction results are associated, as binary values or multiple values of 8 bits or the like, with the respective pixels which constitute the moving object passage map PassMask(n).

For example, the second generation unit 141 generates a binary moving object passage map PassMask(n) that is a black-and-white image in which pixel positions with such pixel differences of 0 or less are represented by 0 and pixel positions with such pixel differences of larger than 0 are represented by 1. Further, for example, the second generation unit 141 generates a moving object passage map PassMask(n) that is a monochrome image in which pixel positions with such pixel differences of 0 or less are represented by 0 and pixel positions with such pixel differences of larger than 0 are represented by multiple values such as 0 to 255 corresponding to the differences.

The moving object passage map PassMask(n) thus generated indicates pixel positions of a region (the moving object passage region) through which the moving object displayed on the first motion map Mask(n) has passed until reaching a state of this first motion map Mask(n). Moreover, since the moving object passage map PassMask(n) is a black-and-white image or a monochrome image, a bit depth of the moving object passage map PassMask(n) becomes smaller than the bit depths of the original frame image Image(n) and frame image Image(n−1). That is, in the third generation unit 142 on the subsequent stage to the second generation unit 141, the processing can be advanced on the basis of the moving object passage map PassMask(n) in which the bit depth is reduced, and accordingly, the memory capacity and the processing load, which are related to the processing, can be suppressed.

The third generation unit 142 integrates (hereinafter, also referred to as "merges") the first motion map Mask(n) and the moving object passage map PassMask(n) multiplied by a predetermined strength with each other, thereby generating the second motion map MergeMask(n) related to the current frame. Specifically, on the basis of the following Equation (1), the third generation unit 142 merges the first motion map Mask(n) and the moving object passage map PassMask(n) with each other for each of the pixels located at the same pixel positions.

$$\text{MergeMask}(n) = \text{Mask}(n) + \{\text{PMRATIO} \times \text{PassMask}(n)\} \quad (1)$$

Herein, PMRATIO is an afterimage suppression strength. The afterimage suppression strength is an element that corresponds to a first value and contributes to a parameter adjustment in the adjustment unit 143, which will be described later. For the afterimage suppression strength, a value larger than "0.0" and smaller than "1.0" is set. By setting a larger value for the afterimage suppression strength, such a strength (the afterimage suppression strength) related to the reduction of the noise (the afterimage noise) that occurs following the movement of the moving object can be increased.

Note that, though it is possible to arbitrarily set the value of the afterimage suppression strength, this value may be set automatically. For example, the third generation unit 142 may be configured to increase/decrease the afterimage suppression strength according to the size of the moving object passage region displayed on the moving object passage map PassMask(n). In this case, preferably, the third generation unit 142 increases the afterimage suppression strength as the moving object passage region is larger.

The second motion map MergeMask(n) generated on the basis of the above-described Equation (1) comes to show the presence region of the moving object, which is displayed on the first motion map Mask(n), and the pixel positions of the moving object passage region through which the moving object has passed. Further, as a value of each pixel which constitutes the moving object passage region, a larger value is set as the moving object passage region is closer in chronological order. Hereinafter, the values of the respective pixels which constitute the second motion map MergeMask(n) will also be referred to as motion information.

The second motion map MergeMask(n) generated by the third generation unit 142 is delivered to the adjustment unit 143, and is stored in the first storage unit 21 (see FIG. 1). The second motion map MergeMask(n) stored in the first storage unit 21 is input to the afterimage processing unit 14 when a first motion map Mask(n+1) related to the frame image Image(n+1) in the next frame is input to the afterimage processing unit 14. That is, the first storage unit 21 stores and holds the second motion map MergeMask(n−1) generated for the past frame that is one frame before the frame of the latest frame image Image(n) newly input. Then, the second motion map MergeMask(n−1) that is stored in the first storage unit 21 and is related to the past frame that is one frame before is input to the afterimage processing unit 14 when the latest first motion map Mask(n) is input to the afterimage processing unit 14.

As described above, in the image processing apparatus 1, every time when a new frame image is input thereto, the second motion map MergeMask (for example, n−1) generated for the frame images for the preceding two frames is recursively used as a past map image related to the past frame. Then, from the past map image, the second generation unit 141 subtracts the first motion map Mask (for example, n) related to the current frame that is newly input, thereby generating the moving object passage map PassMask(n).

The adjustment unit 143 adjusts the parameter related to the 3DNR processing of the 3DNR processing unit 16 on the basis of the second motion map MergeMask(n) related to the current frame. In the present embodiment, the adjustment unit 143 adjusts a parameter PR1 related to an operation of the composition processing unit 15.

Specifically, the adjustment unit 143 adjusts a composition ratio of the frame image Image(n) and the frame image Image(n−1) in units of pixels on the basis of the motion information of each of the pixels which constitute the second motion map MergeMask(n). Herein, the adjustment unit 143 adjusts the parameter PR1 so that the composition ratio of the frame image Image(n) of the current frame becomes larger in the pixel with a larger value of the motion information.

Figure 3:
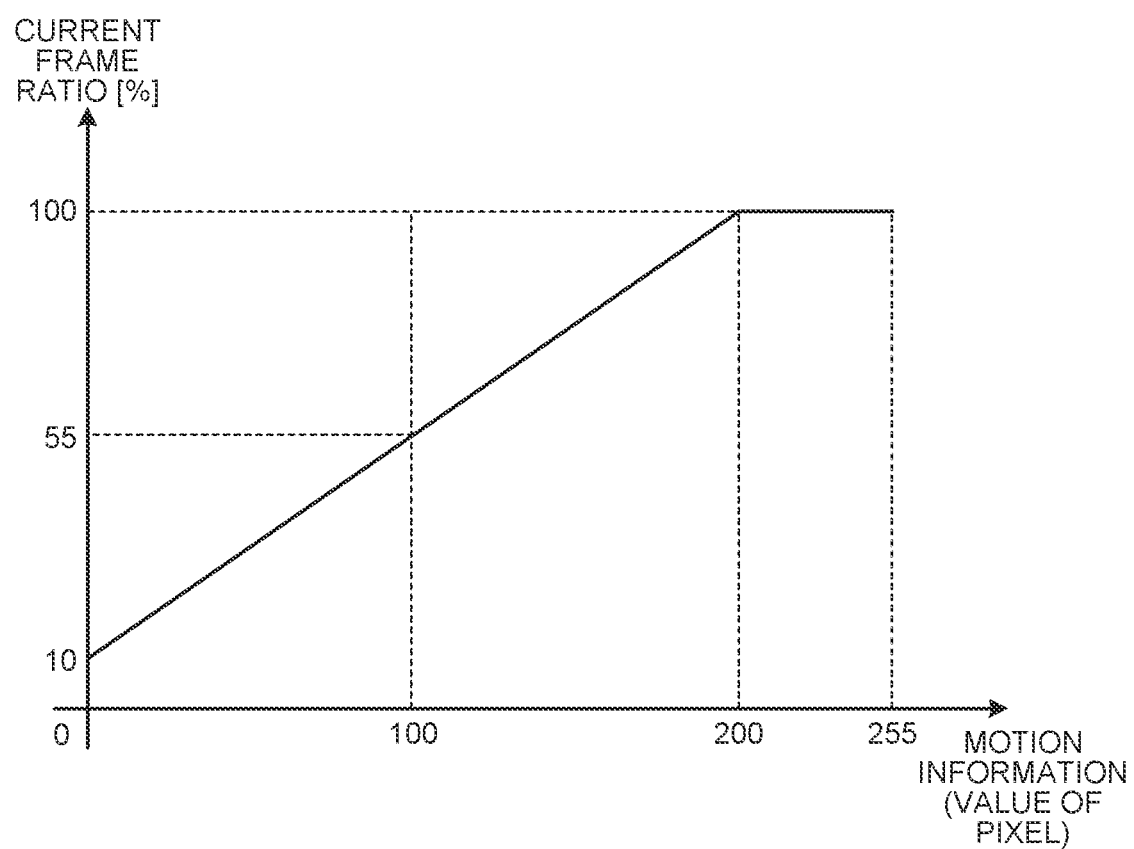
FIG. 3 is a view for explaining an example of a parameter adjustment method according to the first embodiment.

FIG. 3 is a view for explaining an example of an adjustment method of the parameter PR1. In FIG. 3, a vertical axis means the composition ratio (%) of the frame image Image(n) of the current frame. A horizontal axis means the value of the motion information. Note that, in FIG. 3, an example in which the motion information is represented by the values of 0 to 255, but it is not limited thereto.

In the adjustment method in FIG. 3, on the basis of the value of the motion information of each of the pixels which constitute the second motion map MergeMask(n), the adjustment unit 143 determines the composition ratio of the frame image Image(n) at the pixel position corresponding thereto.

For example, for the pixel in which the value of the motion information is "0", that is, for a pixel in a still region other than the presence region of the moving object and the moving object passage region, the adjustment unit 143 adjusts the parameter PR1 so that the composition ratio of the frame image Image(n) becomes 10%. Moreover, for example, for a pixel in which the value of the motion information is "100", the adjustment unit 143 adjusts the parameter PR1 so that the composition ratio of the frame image Image(n) becomes 55%. Further, for a pixel in which the value of the motion information is "200" or more, the adjustment unit 143 adjusts the parameter PR1 so that the ratio of the frame image Image(n) becomes 100%.

Note that, in FIG. 3, an example is illustrated in which the composition ratio of the frame image Image(n) is increased in proportion to the value of the motion information, but the adjustment method of such a composition parameter is not limited to this. For example, the composition ratio of the frame image Image(n) may be increased step by step according to the value of the motion information.

Returning to FIG. 1, to the composition processing unit 15, there are input: the frame image Image(n) and the frame image Image(n−1), which are already subjected to the 2DNR processing by the first 2DNR processing unit 11 and the second 2DNR processing unit 12. On the basis of the parameter PR1 given as an instruction from the afterimage processing unit 14, the composition processing unit 15 executes composition processing (also referred to as alpha blending) for compositing the frame image Image(n) and the frame image Image(n−1) with each other.

Specifically, on the basis of the parameter PR1 given as an instruction from the afterimage processing unit 14 (the adjustment unit 143), the composition processing unit 15 sets the composition ratio of the frame image Image(n) and the frame image Image(n−1) in the units of pixels. Then, the composition processing unit 15 composites the frame image Image(n) and the frame image Image(n−1) with each other in the set composition ratio, and outputs a frame image DNR_Image(n) already subjected to the 3DNR.

As described above, the 3DNR processing unit 16 constituted of the first 2DNR processing unit 11, the second 2DNR processing unit 12 and the composition processing unit 15 executes the 3DNR processing that is based on the current frame and the past frame past from the current frame.

Incidentally, in the conventional technique of the 3DNR processing, there is a possibility that a noise may occur in the still region through which the moving object has already passed, that is, in the moving object passage region. Specifically, in the conventional technique, the moving object passage region through which the moving object has passed in the past frame is processed as a mere still region in the current frame. Moreover, with regard to the composition ratio of the current frame and the past frame in the still region, that of the past frame is larger, and therefore, an influence of the past frame becomes dominant.

Accordingly, in the conventional technique, the moving object that was present in the past frame has remained in the frame image after the composition, and there has been a possibility that such a remaining portion may cause such a noise (an afterimage noise) in which the moving object leaves a trail behind the same. Moreover, a processing result of the 2DNR processing performed in the past frame is strongly reflected on the moving object passage region in the current frame. Accordingly, there has been a possibility that a resolution degradation due to the 2DNR processing may appear in the frame image after the composition.

Meanwhile, the image processing apparatus 1 of the present embodiment extracts the presence region of the moving object and the moving object passage region of that moving object from the frame images for at least the latest three frames. Then, on the basis of the second motion map MergeMask(n) formed by merging the presence region of the moving object and the moving object passage region multiplied by the afterimage suppression strength with each other, the image processing apparatus 1 adjusts the composition ratio of the frame image Image(n) and the frame image Image(n−1).

Thus, in the image processing apparatus 1, the composition ratio of the frame image Image(n) in the moving object passage region can be adjusted to be larger than that of the frame image Image(n−1). As mentioned above, the afterimage noise that occurs in the moving object passage region is derived from the past frame rather than from the current frame. Accordingly, the composition ratio of the frame image Image(n) of the current frame is increased, whereby the afterimage noise can be reduced. Further, such a pixel with a larger value of the motion information, that is, a pixel that is more likely to remain even after the composition can increase the composition ratio of the frame image Image(n), and therefore, can efficiently reduce the afterimage noise derived from the past frame.

Note that the frame image DNR_Image(n) after the 3DNR is output from the image processing apparatus 1 to an external apparatus such as a display apparatus, and is stored in the second storage unit 22. When the frame image Image(n+1) of the next frame is input to the first 2DNR processing unit 11 and the first generation unit 13, the frame image DNR_Image(n) stored in the second storage unit 22 is input as the frame image Image(n) to the second 2DNR processing unit 12 and the first generation unit 13. That is, the second storage unit 22 stores and holds the frame image DNR_Image(n-1) generated for the past frame that is one frame before the frame of the latest frame image Image(n) to be newly input. Then, when the latest frame image Image(n) is input to the first 2DNR processing unit 11 and the first generation unit 13, the frame image DNR_Image (n-1) that is related to the past frame that is one frame before and is stored in the second storage unit 22 is input as the frame image Image(n-1) to the second 2DNR processing unit 12 and the first generation unit 13.

As described above, in the image processing apparatus 1, every time when a new frame image is input thereto, the frame image DNR_Image (for example, n-1) that is generated for the frame images for the preceding two frames and is already subjected to the 3DNR is recursively used as the frame image (for example, n-1) of the past frame.

Figure 4:
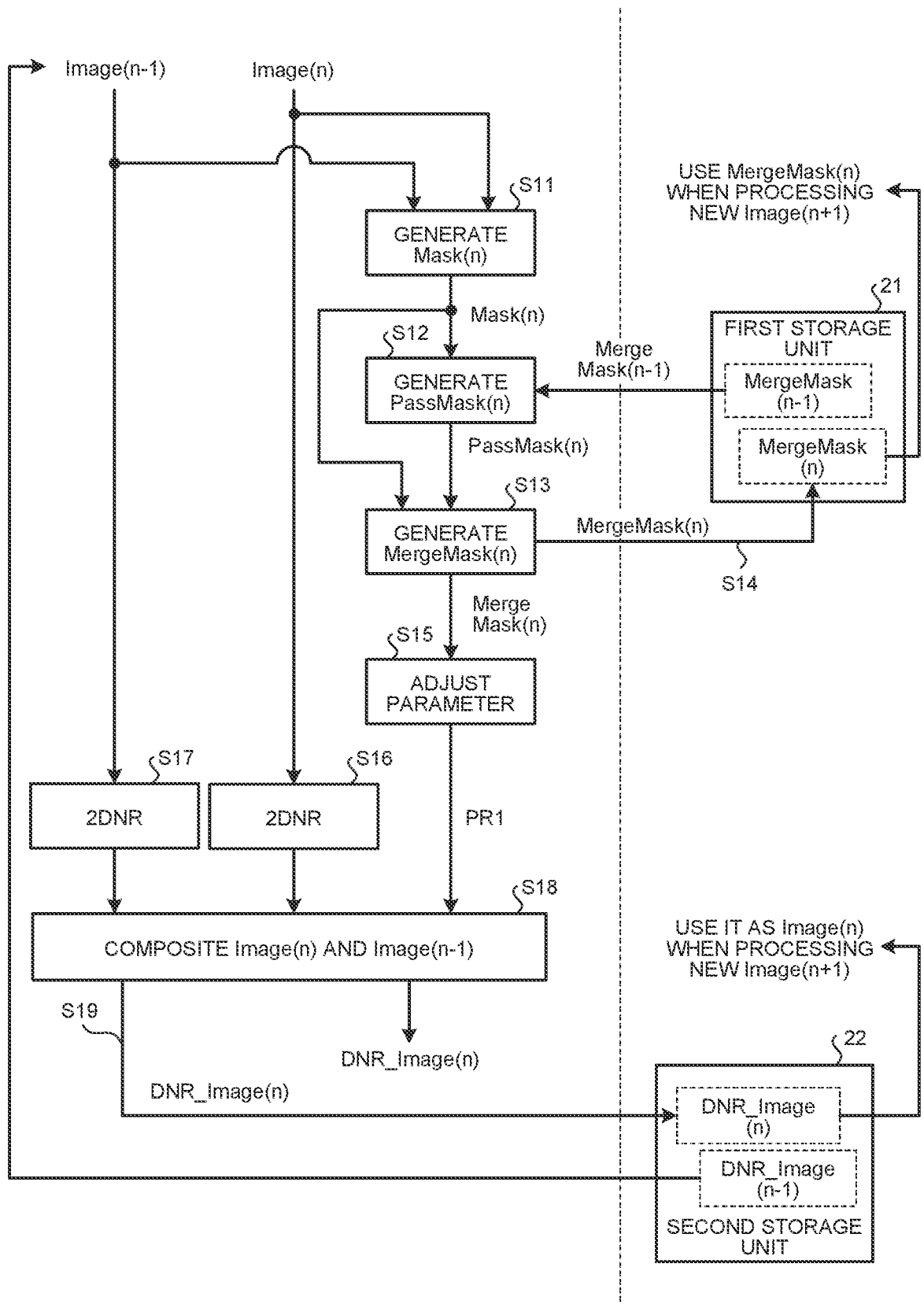
FIG. 4 is an explanatory diagram for explaining an overall operation of the image processing apparatus according to the first embodiment.

Next, referring to FIGS. 4 and 5, a description will be given of operations of the image processing apparatus 1 according to the present embodiment. Herein, FIG. 4 is an explanatory diagram for explaining an overall operation of the image processing apparatus 1. Further, FIG. 5 is an explanatory view for explaining operations of the first generation unit 13 and the afterimage processing unit 14.

Note that, in FIG. 4, in a left region divided by a broken line, illustrated are operations of the first 2DNR processing unit 11, the second 2DNR processing unit 12, the first generation unit 13, the afterimage processing unit 14, and the composition processing unit 15. Further, in a right region divided by the broken line, the first storage unit 21 and the second storage unit 22, which are illustrated in FIG. 1, are illustrated.

Figure 5:
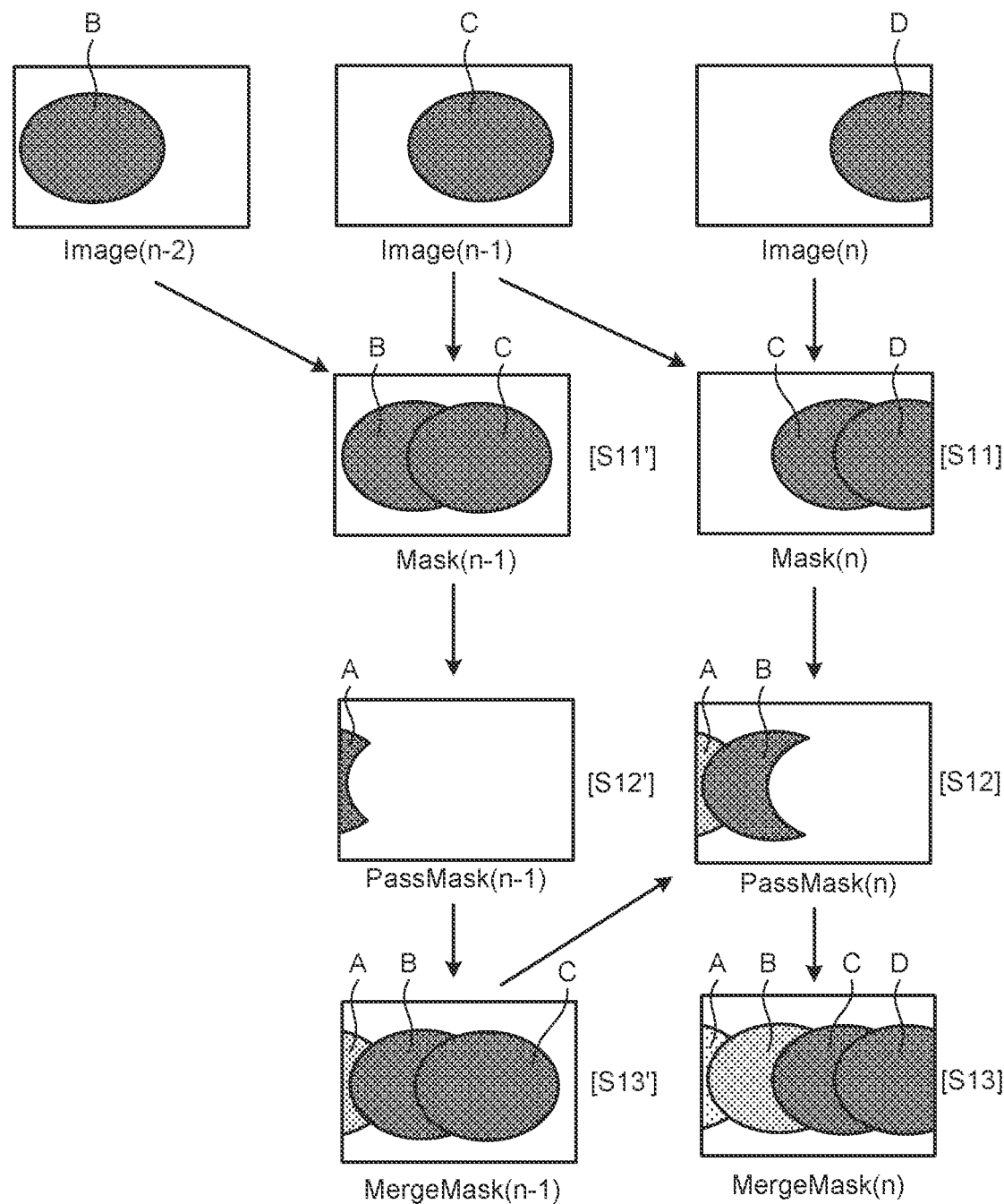
FIG. 5 is an explanatory view for explaining operations of a first generation unit and the afterimage processing unit according to the first embodiment.

Moreover, in FIG. 5, the frame images Image(n-2) to Image(n) mean three frame images successive in chronological order. Further, hatched regions in the frame images represent positions where the moving object is present, and indicate a state in which the same moving object moves from the left toward the right in FIG. 5. Further, reference symbols A to D added to the respective moving objects are identifiers for identifying from which frame images the moving objects are derived. Specifically, the moving object B means a moving object included in the frame image Image(n-2), the moving object C means a moving object included in the frame image Image(n-1), and the moving object D means a moving object included in the frame image Image(n). Note that the moving object A means a moving object included in a frame image Image(n-3) (not illustrated).

Moreover, in FIGS. 4 and 5, it is assumed that, up to the stage of the past frame image Image(n-1) that is in one frame before the current frame, the 3DNR processing is already completed, that is, the first motion map Mask(n-1), the second motion map MergeMask(n-1) and the frame image DNR_Image(n-1) already subjected to the 3DNR are already generated.

First, on the basis of the frame image Image(n) of the current frame and the past frame image Image(n-1) in one frame before the current frame, the first generation unit 13 generates the first motion map Mask(n) (Step S11). The past frame image Image(n-1) in one frame before corresponds to the frame image DNR_Image(n-1) that is already subjected to the 3DNR and is related to the past frame that is one frame before, the frame image DNR_Image(n-1) being stored in the second storage unit 22.

Herein, as illustrated in FIG. 5, the first motion map Mask(n) becomes an image that represents the presence region where the moving object is present in both of the frame images which are the frame image Image(n) and the frame image Image(n-1).

Subsequently, from the second motion map MergeMask (n-1) that is related to the past frame that is one frame before and is stored in the first storage unit 21, the second generation unit 141 subtracts the first motion map Mask(n) related to the current frame, thereby generating the moving object passage map PassMask(n) (Step S12).

Herein, as illustrated in FIG. 5, the moving object passage map PassMask(n) becomes an image in which the presence region of the moving object, which is displayed on the first motion map Mask(n), is removed from the presence region of the moving object and the moving object passage region, which are displayed on the second motion map MergeMask (n-1). That is, on the moving object passage map PassMask (n), the presence region of the moving object, which is included in the frame image Image(n-2) before at least the frame image Image(n-1), will be displayed as the moving object passage region.

Subsequently, on the basis of the above-mentioned Equation (1), the third generation unit 142 merges the moving object passage map PassMask(n), which is multiplied by the afterimage suppression strength, with the first motion map Mask(n), thereby generating the second motion map MergeMask(n) (Step S13).

Thus, as illustrated in FIG. 5, the second motion map MergeMask(n) becomes an image in which the presence region of the moving object and the moving object passage region multiplied by the afterimage suppression strength are merged with each other. In FIG. 5, a magnitude relationship in the motion information is represented by shades of hatching. Herein, the magnitude relationship in the motion information is established as: moving object A<moving object B<moving object C=moving object D. That is, values of the motion information become larger in the moving object passage region derived from such a frame later in chronological order, and become smaller in the moving object passage region derived from such a frame more past therein since the number of multiplications of the afterimage suppression strength increases.

Moreover, the third generation unit 142 stores the generated second motion map MergeMask(n) in the first storage unit 21 (Step S14).

As mentioned above, when the frame image Image(n) is input, the second motion map MergeMask(n-1) stored in the first storage unit 21 is used as the second motion map MergeMask(n-1), which is related to the past frame that is one frame before, for generating the moving object passage map PassMask(n). Moreover, when the frame image Image (n+1) in the new frame is input, the second motion map MergeMask(n) stored in the first storage unit 21 following the processing of the frame image Image(n) is used as the second motion map MergeMask(n), which is related to the past frame that is one frame before, for generating a moving object passage map PassMask(n+1).

As described above, in the image processing apparatus 1, every time when the new frame image (example: n) is input thereto, the second motion map MergeMask (example: n−1) generated for the frame images for the preceding two frames is recursively used as the past map image related to the past frame.

Subsequently, the adjustment unit 143 adjusts the parameter PR1 related to the composition ratio of the frame image Image(n) and the frame image Image(n−1) on the basis of the values of the motion information of the respective pixels which constitute the second motion map MergeMask(n) (Step S15).

Meanwhile, the first 2DNR processing unit 11 and the second 2DNR processing unit 12 perform the 2DNR processing for the respective input frame image Image(n) and frame image Image(n−1) (Steps S16 and S17).

Subsequently, on the basis of the parameter PR1 adjusted by the adjustment unit 143, the composition processing unit 15 composites the frame image Image(n) and the frame image Image(n−1), which are already subjected to the 2DNR processing, with each other, and outputs the frame image DNR_Image(n) already subjected to the 3DNR (Step S18).

Moreover, the composition processing unit 15 stores the frame image DNR_Image(n) in the second storage unit 22 (Step S19).

As mentioned above, when the frame image Image(n) is input, the frame image DNR_Image(n−1) stored in the second storage unit 22 is used as the frame image Image(n−1), which is related to the past frame that is one frame before, for generating the frame image DNR_Image(n). Further, when the frame image Image(n+1) in the new frame is input, the frame image DNR_Image(n) stored in the second storage unit 22 following the processing of the frame image Image(n) is used as the frame image Image(n), which is related to the past frame that is one frame before, for generating the frame image DNR_Image(n+1).

As described above, every time when the new frame image (example: n) is input, the frame image DNR_Image (example: n−1) that is generated for the frame images for the preceding two frames and is already subjected to the 3DNR processing is recursively used as the frame image (example: n−1) of the past frame.

Figure 6:
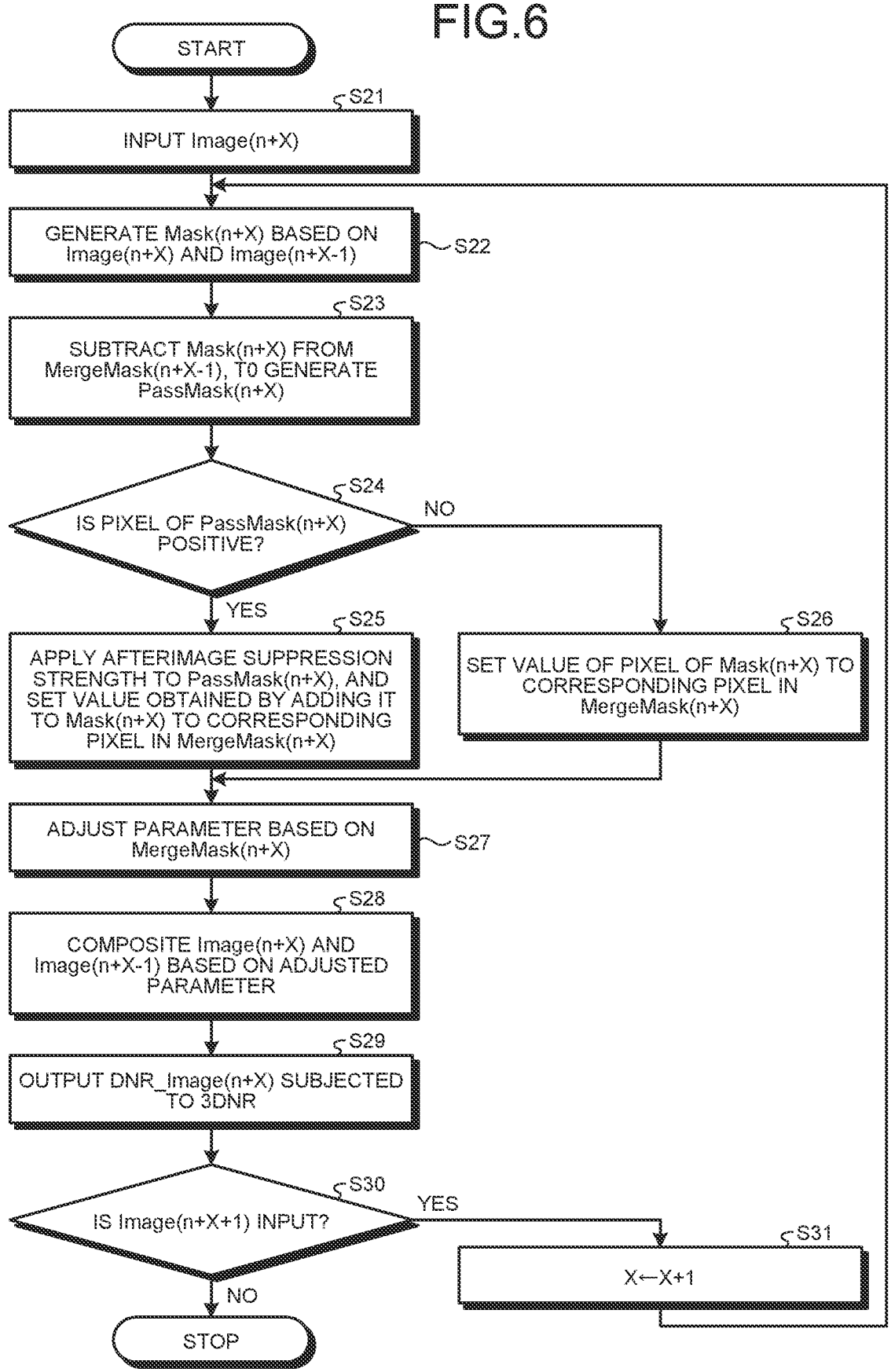
FIG. 6 is a flowchart illustrating an example of processing performed by the first generation unit, the afterimage processing unit and a composition processing unit in the first embodiment.

Next, referring to FIG. 6, a description will be given of a flow of processing performed by the first generation unit 13, the afterimage processing unit 14 and the composition processing unit 15, which are mentioned above. FIG. 6 is a flowchart illustrating an example of the processing performed by the first generation unit 13, the afterimage processing unit 14 and the composition processing unit 15. In the present processing, a description will be given of operations in the case of using a latest frame image Image(n+X) as a base point and processing a future frame image to be input after this Image(n+X). Note that "X" is an integer.

First, upon detecting an input of the frame image Image(n+X) (Step S21), the first generation unit 13 generates a first motion map Mask(n+X) on the basis of the frame image Image(n+X) and a frame image Image(n+X−1) (Step S22). Herein, the frame image Image(n+X−1) corresponds to a frame image DNR_Image(n+X−1) stored in the second storage unit 22.

Subsequently, the second generation unit 141 subtracts the first motion map Mask(n+X) from a second motion map MergeMask(n+X−1), and generates a moving object passage map PassMask(n+X) that displays pixels in which results of the subtraction become positive (Step S23).

Subsequently, the third generation unit 142 merges the moving object passage map PassMask(n+X) and the first motion map Mask(n+X) with each other, thereby generating a second motion map MergeMask(n+X). Specifically, the third generation unit 142 executes the following processing for each of the pixel positions of the respective pixels which constitute the second motion map MergeMask(n+X), thereby setting the motion information of the respective pixels.

First, the third generation unit 142 refers to values of the respective pixels which constitute the moving object passage map PassMask(n+X), and determines whether or not the values are positive (Step S24). Herein, the third generation unit 142 determines the moving object passage region when the values of the pixels are positive (Step S24; Yes). In this case, the third generation unit 142 adds values, which are obtained by multiplying, by the afterimage suppression strength, the values of the pixels determined to be the moving object passage region, to values held by the first motion map Mask(n+X), and sets values thus obtained to the motion information of the corresponding pixels in the second motion map MergeMask(n+X) (Step S25). Further, when the values of the pixels are not positive, the third generation unit 142 determines a moving object region or a still region (Step S24; No). In this case, the third generation unit 142 sets the values at the same pixel positions, which are held by the first motion map Mask(n+X), to the motion information of the corresponding pixels in the second motion map MergeMask(n+X) (Step S26).

Subsequently, on the basis of the second motion map MergeMask(n+X) generated by the third generation unit 142, the adjustment unit 143 adjusts the parameter PR1 related to the composition processing of the composition processing unit 15 (Step S27).

Subsequently, on the basis of the parameter PR1 adjusted by the adjustment unit 143, the composition processing unit 15 composites the frame image Image(n+X) and the frame image Image(n+X−1), which are already subjected to the 2DNR processing, with each other (Step S28). Then, the composition processing unit 15 outputs the composited frame image as a frame image DNR_Image(n+X) already subjected to the 3DNR (Step S29).

Subsequently, the first generation unit 13 determines whether or not a new frame image Image(n+X+1) is input (Step S30). Herein, when the input is detected (Step S30; Yes), then in order to process the input frame image Image(n+X+1) as a current frame, the first generation unit 13 turns "X+1" to "X" (Step S31), and returns the processing to Step S22. Thus, the processing in Steps S22 to S31 mentioned above is sequentially executed for the frame image Image(n+X). As described above, in the present processing, the value of "X" is increased by one every time when the new frame image is input, and the frame image Image(n+X−1) and the second motion map MergeMask(n+X−1), which correspond to the value of this X, are used in Steps S22 and S23.

Note that, when the input of the frame image Image(n+X+1) is not detected in Step S30, for example, when the input of the frame image is temporarily suspended (Step S30; No), the processing is ended. Then, when the input of the frame image is resumed, the processing is started from Step S21.

As described above, the image processing apparatus 1 according to the present embodiment generates the first motion map Mask(n) from the frame image Image(n) and the frame image Image(n−1) for the latest two frames among the plurality of frame images which are successively input. Further, the image processing apparatus 1 subtracts the first motion map Mask(n) from the second motion map MergeMask(n−1) that shows the presence region of the moving object, which is included in the frame image before the frame image Image(n), thereby generating the moving object passage map PassMask(n). Further, the image processing apparatus 1 merges the moving object passage map PassMask(n) multiplied by the afterimage suppression strength and the first motion map Mask(n) with each other, and generates the second motion map MergeMask(n). Then, the image processing apparatus 1 adjusts the parameter PR1, which is related to the composition processing of the frame image Image(n) and the frame image Image(n−1), on the basis of the second motion map MergeMask(n).

Thus, the image processing apparatus 1 can change the composition ratio of the frame image Image(n) in the moving object passage region according to the parameter PR1, and accordingly, can reduce the afterimage noise that occurs in the moving object passage region. Hence, the image processing apparatus 1 can output the frame image (DNR_Image(n)) in which the afterimage noise is suppressed.

Further, the image processing apparatus 1 according to the present embodiment adjusts the parameter, which is related to the 3DNR processing, by using the first motion map, the moving object passage map and the second motion map, in each of which the bit depth is reduced in comparison with the frame images. Thus, the image processing apparatus 1 can suppress the processing load and the memory usage, which are related to the adjustment of the parameter, and therefore, can enhance the efficiency of the processing.

Moreover, the image processing apparatus 1 according to the present embodiment can integrate and hold, into the second motion map, the presence positions of the moving object and the moving object passage regions, which are included in the frame images for at least three frames. Thus, for example, in comparison with a configuration of individually holding the frame images for three frames, the image processing apparatus 1 can reduce the memory capacity for use and the number of memories for use, and accordingly, can increase the processing efficiency.

Note that, by changing a part of the configuration or function of the image processing apparatus 1, the above-mentioned embodiment can be appropriately modified and implemented. Therefore, some modifications related to the above-mentioned embodiment will be described below as other embodiments. Note that a description will be mainly given below of different points from those of the above-mentioned embodiment, and a detailed description of points common to those in the contents already described will be omitted. Further, the modifications which will be described below may be individually implemented, or may be implemented in appropriate combination.

First Modification

In the above-mentioned embodiment, the description is given of a mode where the adjustment unit 143 adjusts the parameter PR1, which is related to the operations of the composition processing unit 15, as the parameter related to the 3DNR processing. However, the parameter to be adjusted is not limited to that regarding the composition processing unit 15.

Accordingly, in the present modification, a description will be given of a mode where the adjustment unit 143 adjusts parameters PR2 and PR3 related to the operations of the first 2DNR processing unit 11 and the second 2DNR processing unit 12.

In the image processing apparatus 1 according to the present modification, as illustrated in FIG. 1, the first 2DNR processing unit 11 and the second 2DNR processing unit 12 are connected to the afterimage processing unit 14 (see broken line portions in FIG. 1).

The first 2DNR processing unit 11 and the second 2DNR processing unit 12 determine the strength and the like of the 2DNR processing on the basis of the parameters PR2 and PR3 adjusted by the afterimage processing unit 14 (the adjustment unit 143), respectively. Note that a method of changing the strength of the 2DNR processing includes, for example, changing a size or coefficient of a filter, and is not particularly limited.

Further, the adjustment unit 143 according to the present modification adjusts the parameters PR2 and PR3, which are related to the operations of the first 2DNR processing unit 11 and the second 2DNR processing unit 12, on the basis of the second motion map MergeMask(n) generated by the third generation unit 142. Specifically, the adjustment unit 143 adjusts, in the units of pixels, such strengths of pieces of the 2DNR processing, which are performed by the first 2DNR processing unit 11 and the second 2DNR processing unit 12, on the basis of the motion information of each of the pixels which constitute the second motion map MergeMask(n).

For example, the adjustment unit 143 adjusts the parameter PR2 of the first 2DNR processing unit 11 so that the strength of the 2DNR processing, which is executed for the frame image Image(n), becomes larger in the pixel with a larger value of the motion information. Further, the adjustment unit 143 adjusts the parameter PR3 of the second 2DNR processing unit 12 so that the strength of the 2DNR processing, which is executed for the frame image Image(n−1), becomes larger in the pixel with a larger value of the motion information.

Herein, the adjustment unit 143 may designate the strengths of the 2DNR of the first 2DNR processing unit 11 and the second 2DNR processing unit 12 by a ratio like the above-mentioned composition ratio in the composition processing unit 15, or may designate the respective strengths on the basis of independent criteria.

With the above-described configuration, according to the motion information of the moving object passage region displayed on the second motion map MergeMask(n), the image processing apparatus 1 can adjust the strengths of the pieces of 2DNR processing, which are performed for this moving object passage region by the first 2DNR processing unit 11 and the second 2DNR processing unit 12.

Next, referring to FIG. 7, a description will be given of operations of the image processing apparatus 1 according to the present modification. Herein, FIG. 7 is an explanatory diagram for explaining an overall operation of the image processing apparatus 1 according to the first modification.

Figure 7:
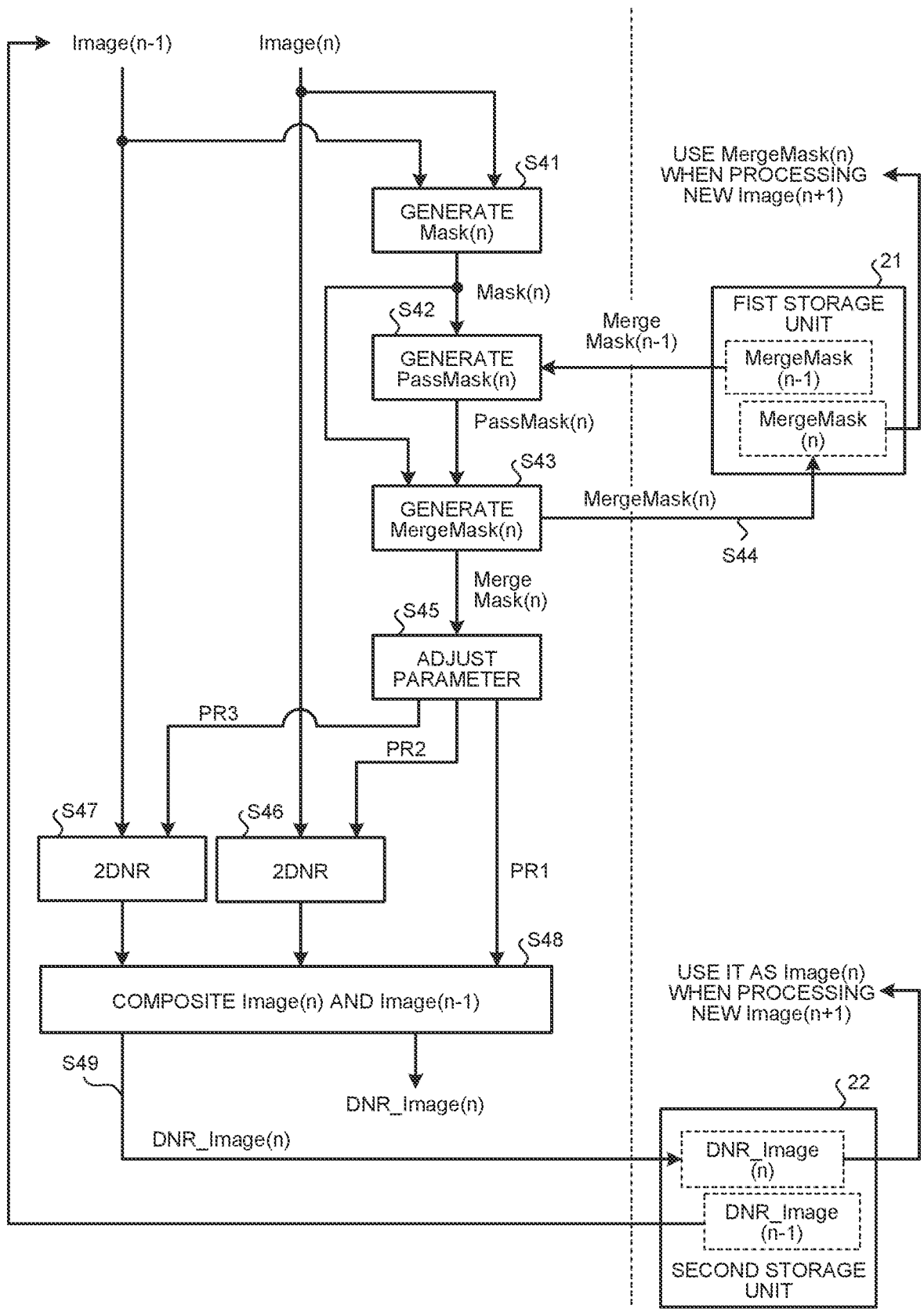
FIG. 7 is an explanatory diagram for explaining an overall operation of an image processing apparatus according to a first modification of the first embodiment.

In FIG. 7, as in FIG. 4 mentioned above, on a left region divided by a broken line, operations of the first 2DNR processing unit 11, the second 2DNR processing unit 12, the first generation unit 13, the afterimage processing unit 14, and the composition processing unit 15, and in a right region divided by the broken line, input and output states of data to and from the first storage unit 21 and the second storage unit 22 are illustrated. Note that Steps S41 to S44 are similar to Steps S11 to S14 described in FIG. 4, and accordingly, a description thereof will be omitted.

After Step S44, the adjustment unit 143 adjusts the parameter PR1 of the composition processing unit 15 on the basis of the second motion map MergeMask(n), and adjusts the parameters PR2 and PR3 of the first 2DNR processing unit 11 and the second 2DNR processing unit 12 on the basis thereof (Step S45).

The first 2DNR processing unit 11 executes the 2DNR processing for the frame image Image(n) with the strength corresponding to the already adjusted parameter PR2 (Step S46). Further, the second 2DNR processing unit 12 executes the 2DNR processing for the frame image Image(n−1) with the strength corresponding to the already adjusted parameter PR3 (Step S47).

Subsequently, on the basis of the parameter PR1 given as an instruction from the adjustment unit 143, the composition processing unit 15 composites the frame image Image(n) and the frame image Image(n−1), which are already subjected to the 2DNR, with each other, thereby outputting the frame image DNR_Image(n) already subjected to the 3DNR (Step S48). Note that Step S49 is similar to Step S19 described in FIG. 4.

As described above, in accordance with the image processing apparatus 1 according to the present modification, the strengths of the pieces of 2DNR processing for the moving object passage region can be changed by adjusting the parameters PR2 and PR3, and accordingly, the afterimage noise that occurs in the moving object passage region can be reduced. Hence, the image processing apparatus 1 can output the frame image (DNR_Image(n)) in which the afterimage noise is suppressed. Further, in addition to the strengths of the pieces of 2DNR processing for the moving object passage region, the composition ratio of the frame image Image(n) can also be adjusted, and therefore, the afterimage noise that occurs in the moving object passage region can be further reduced.

Note that, though the mode of adjusting both of the parameter PR2 and the parameter PR3 is adopted in the present modification, a mode of adjusting either one thereof (for example, only the parameter PR3) may be adopted. Moreover, a mode of adjusting only the parameters PR2 and PR3 without adjusting the parameter PR1 may be adopted.

Second Modification

In the above-mentioned embodiment, the configuration of the image processing apparatus 1 is described with reference to FIG. 1; however, the configuration of the image processing apparatus 1 is not limited to this. For example, the image processing apparatus 1 may be further provided with functions related to efficiency increase of the 3DNR processing, stabilization of the frame image, and the like. In the present modification, another configuration example of the image processing apparatus 1 will be described.

Figure 8:
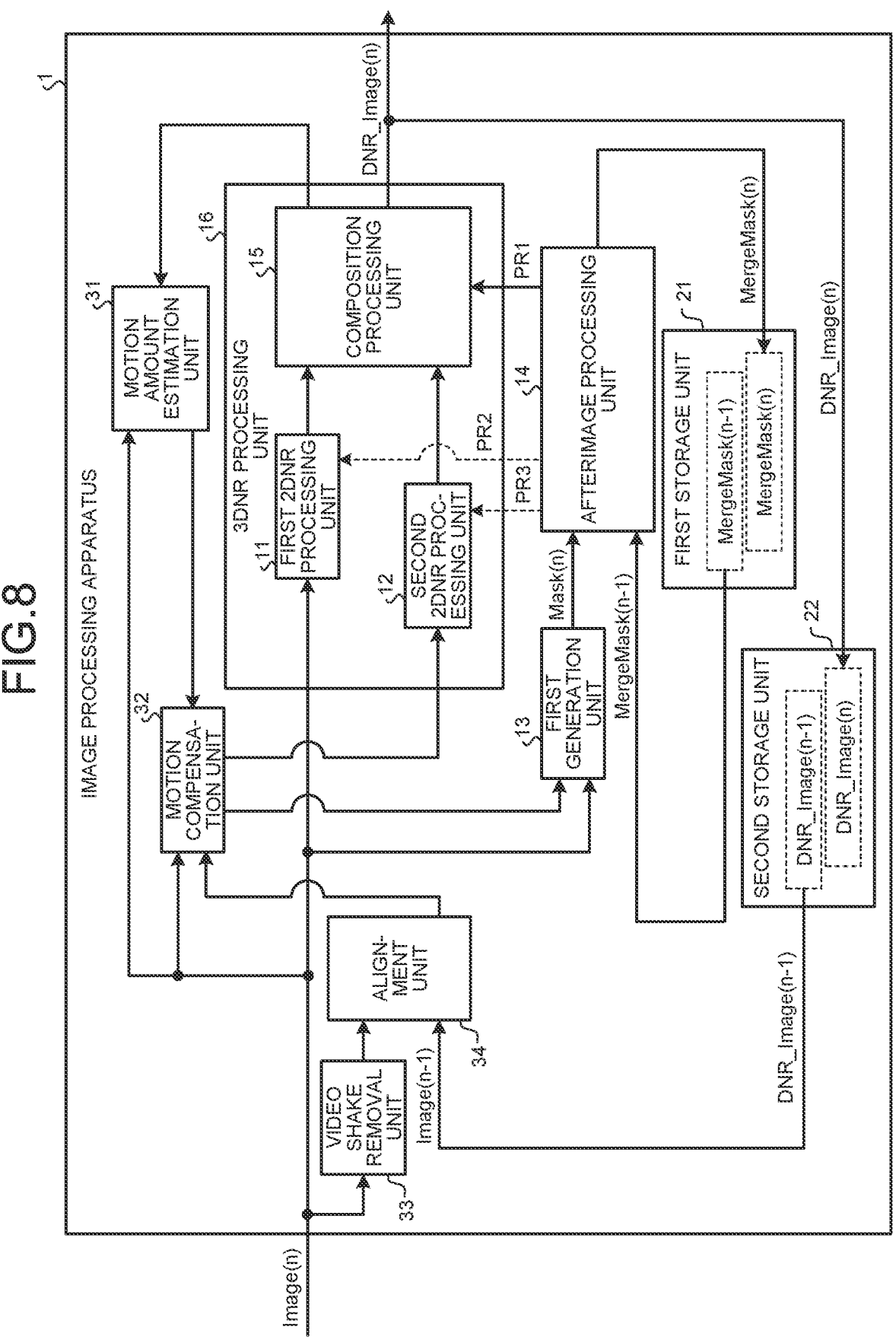
FIG. 8 is a diagram illustrating an example of a configuration of an image processing apparatus according to a second modification of the first embodiment.

FIG. 8 is a diagram illustrating an example of a configuration of an image processing apparatus 1 according to the present modification. As illustrated in FIG. 8, the image processing apparatus 1 according to the present modification further includes a motion amount estimation unit 31, a motion compensation unit 32, a video shake removal unit 33, and an alignment unit 34 in addition to the configuration in FIG. 1 mentioned above. Herein, the motion amount estimation unit 31 is an example of a motion amount estimation unit. The motion compensation unit 32 is an example of a motion compensation unit.

Note that a part or all of the motion amount estimation unit 31, the motion compensation unit 32, the video shake removal unit 33 and the alignment unit 34 may be achieved by a hardware configuration such as a dedicated circuit. Further, a part or all of the motion amount estimation unit 31, the motion compensation unit 32, the video shake removal unit 33 and the alignment unit 34 may be achieved by a software configuration made by cooperation between a program and a processor provided in a computer such as a microcomputer. Examples of the processor include a CPU, a DSP, an FPGA, and a GPU.

To the motion amount estimation unit 31, there are input: the frame image Image(n) of the current frame; and the past frame image Image(n−1) that is one frame before the current frame, that is, the frame image DNR_Image(n−1) that is generated on the basis of the preceding frame image and already subjected to the 3DNR. On the basis of the frame image Image(n) and the frame image Image(n−1), the motion amount estimation unit 31 executes processing (motion estimation: ME) for estimating a movement amount of the moving object included in both of the frame images. Then, the motion amount estimation unit 31 outputs the movement amount of the moving object, which serves as an estimation result, to the motion compensation unit 32.

Note that, though FIG. 8 illustrates an example where the composition processing unit 15 and the motion amount estimation unit 31 are directly connected to each other, the composition processing unit 15 and the second storage unit 22 may be connected to each other. For example, upon detecting the frame image Image(n), the motion amount estimation unit 31 may read out the frame image DNR_Image(n−1) from the second storage unit 22. Note that the readout method of the frame image DNR_Image(n−1) is not limited to this. For example, the inside or outside of the image processing apparatus 1 may be provided with the input/output control unit (not illustrated) that collectively controls the input timing of the frame image Image(n), the readout timing of the frame image DNR_Image(n−1) from the second storage unit 22, and the like.

Moreover, the motion amount estimation unit 31 may be formed to execute the ME processing by using the frame image DNR_Image(n) in which the bit depth or the image size is reduced. For example, in order to suppress the processing load, the motion amount estimation unit 31 may execute the ME processing by using a frame image in which the bit depth or image size of the frame image DNR_Image(n) is reduced to ¼ or the like. Moreover, the ME processing executed by the motion amount estimation unit 31 is capable of using a known technology.

To the motion compensation unit 32, there are input: the frame image Image(n) of the current frame; and the frame image Image(n−1) already aligned by the alignment unit 34 to be described later, in addition to the above-mentioned movement amount of the moving object. On the basis of these pieces of input information, the motion compensation unit 32 executes motion compensation (MC) processing such as inter-frame prediction. Then, the motion compensation unit 32 outputs the frame image Image(n−1), which is already subjected to the MC processing, to the second 2DNR processing unit 12 and the first generation unit 13. Note that the MC processing executed by the motion compensation unit 32 is capable of using a known technology.

To the video shake removal unit 33, the frame image Image(n) of the current frame is input. From the successively input frame image Image(n), the video shake removal unit 33 estimates a shaking direction of the frame image Image(n), and shifts opposite to the shaking direction, thereby removing a video shake such as a camera shake that occurs during imaging. The frame image Image(n) from which the video shake is removed is output to the alignment unit 34. Note that the processing executed by the video shake removal unit 33 is capable of using a known technology.

To the alignment unit 34, there are input the frame image Image(n) from which the video shake is already removed, and the frame image Image(n−1). Herein, the frame image Image(n−1) corresponds to the frame image DNR_Image (n−1) that is generated on the basis of the preceding frame image and is already subjected to the 3DNR processing.

In the present embodiment, upon detecting the frame image Image(n) from which the video shake is already removed, the alignment unit 34 reads out the frame image DNR_Image(n−1) from the second storage unit 22. Note that the readout method of the frame image DNR_Image(n−1) is not limited to this. For example, the inside or outside of the image processing apparatus 1 may be provided with an input/output control unit (not illustrated) that collectively controls input timing of the frame image Image(n) from which the video shake is already removed, readout timing of the frame image DNR_Image(n−1) from the second storage unit 22, and the like.

On the basis of a correlation between the frame image Image(n) and the frame image Image(n−1), the alignment unit 34 aligns the frame image Image(n−1) so that a positional alignment thereof with such an object included in the frame image Image(n) is achieved. The already aligned frame image Image(n) is output to the motion compensation unit 32. Note that the processing executed by the video shake removal unit 33 is capable of using a known technology.

In the above-described configuration, the second 2DNR processing unit 12 executes the 2DNR processing for the frame image Image(n−1) that is input from the motion compensation unit 32 and is already subjected to the MC processing. Thus, the second 2DNR processing unit 12 can perform the 2DNR processing by making full use of the result of the MC processing, and therefore, can remove the noise, which is included in the frame image Image(n−1), more efficiently.

Further, the first generation unit 13 generates the first motion map Mask(n) on the basis of the frame image Image(n−1) for which alignment is performed between the frame image Image(n−1) and the frame image (n) subjected to the video shake removal, and then the motion compensation processing is performed, and the frame image Image (n). Thus, the first generation unit 13 can efficiently extract the presence region where the moving object is present from the frame image Image(n) and the frame image Image(n−1).

Figure 9:
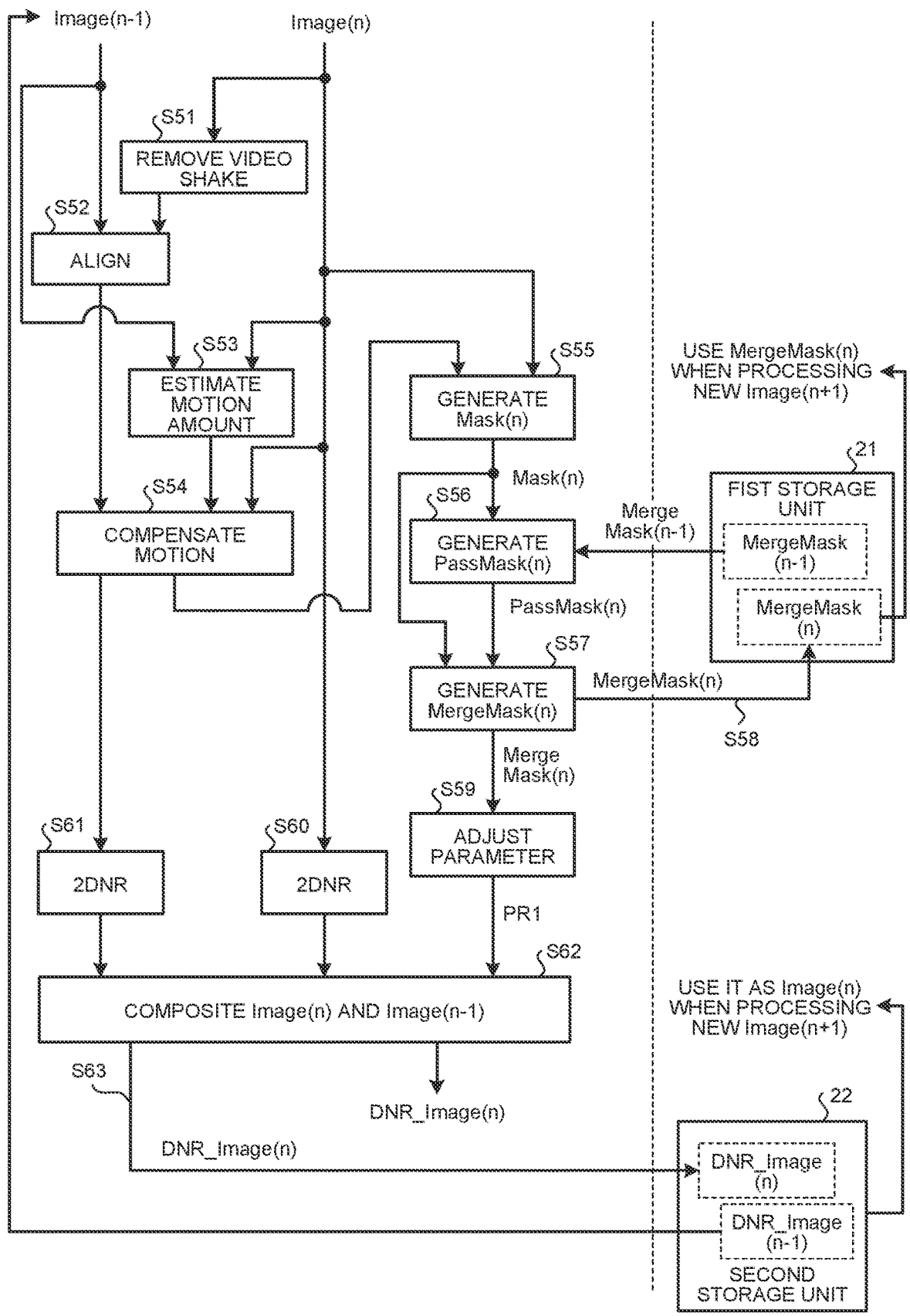
FIG. 9 is an explanatory diagram for explaining an overall operation of the image processing apparatus according to the second modification of the first embodiment.

Next, referring to FIG. 9, a description will be given of operations of the image processing apparatus 1 according to the present modification. Herein, FIG. 9 is an explanatory diagram for explaining an overall operation of the image processing apparatus 1 according to the present modification. Note that, in FIG. 9, in a left region divided by a broken line, illustrated are operations of the first 2DNR processing unit 11, the second 2DNR processing unit 12, the first generation unit 13, the afterimage processing unit 14, the composition processing unit 15, the motion amount estimation unit 31, the motion compensation unit 32, the video shake removal unit 33, and the alignment unit 34. Further, in a right region divided by the broken line, the first storage unit 21 and the second storage unit 22, which are illustrated in FIG. 8, are illustrated.

First, the video shake removal unit 33 executes the processing for removing the video shake from the frame image Image(n) of the current frame (Step S51). Subsequently, the alignment unit 34 aligns the frame image Image(n−1) on the basis of the frame image Image(n) from which the video shake is removed (Step S52).

Meanwhile, on the basis of the frame image Image(n) and the frame image Image(n−1), the motion amount estimation unit 31 executes the ME processing for estimating the motion amount of the moving object included in both of the frame images (Step S53). Subsequently, the motion compensation unit 32 executes the motion compensation (MC) processing on the basis of the frame image Image(n), the already aligned frame image Image(n−1) and a processing result of the ME processing (Step S54).

Subsequently, the first generation unit 13 generates the first motion map Mask(n) on the basis of the frame image Image(n) and the frame image Image(n−1) already aligned and subjected to the motion compensation processing (Step S55). Steps S56 to S59 which follow are similar to Steps S12 to S15 described in FIG. 4, and accordingly, a description thereof will be omitted.

Subsequently, the first 2DNR processing unit 11 executes the 2DNR for the frame image Image(n) (Step S60). Moreover, the second 2DNR processing unit 12 executes the 2DNR for the already aligned frame image Image(n−1) by using a result of the MC processing (Step S61). Steps S62 and S63 which follow are similar to Steps S18 and S19 described in FIG. 4, and accordingly, a description thereof will be omitted.

As described above, the image processing apparatus 1 according to the present modification further includes the motion amount estimation unit 31, the motion compensation unit 32, the video shake removal unit 33, and the alignment unit 34. Thus, the efficiency of the 3DNR processing can be increased, and the frame image can be stabilized. For example, in the case of performing the 2DNR processing by using the processing result of the MC processing, the occurrence of the afterimage noise can be suppressed in comparison with a configuration that does not use the processing result, and accordingly, the afterimage noise can be further reduced.

Note that, in the case of adjusting the parameter PR3 in the configuration of the present modification, preferably, the afterimage suppression strength is set to a value considering a noise suppression effect by the motion compensation unit 32 (the MC processing). As an example, the third generation unit 142 may change the value of the afterimage suppression strength according to whether or not the processing result of the MC processing is input to the second 2DNR processing unit 12.

For example, when the processing result of the MC processing is input to the second 2DNR processing unit 12, the third generation unit 142 decreases the afterimage suppression strength by a predetermined amount in comparison with when this processing result is not input. Thus, the strength of the 2DNR processing performed for the moving object passage region by the second 2DNR processing unit 12 can be varied according to whether or not the processing result of the MC processing is input to the second 2DNR processing unit 12. Hence, the third generation unit 142 can set a strength of the 2DNR processing, which is suitable for reducing the afterimage noise, to the second 2DNR processing unit 12. Moreover, likewise, following the change of the afterimage suppression strength, the 2DNR processing executed by the first 2DNR processing unit 11 also becomes a strength suitable for reducing the afterimage noise. Likewise, the composition ratio (PR1) of the frame image Image(n) and the frame image Image(n−1) in the composition processing unit 15 is also set to a composition ratio suitable for reducing the afterimage noise, whereby the effect of the 3DNR can be further increased.

Second Embodiment

In the above-mentioned first embodiment, the description is given of the mode of using, for generating the moving object passage map PassMask(n), the second motion map MergeMask(n−1) as the past map image related to the past frame. In a second embodiment, a description will be given of a mode of using the first motion map Mask(n−1) as the past map image related to the past frame in place of the second motion map MergeMask(n−1). Note that portions having the same functions and configurations as those of the first embodiment will be denoted by the same reference numerals, and a description thereof will be omitted.

Figure 10:
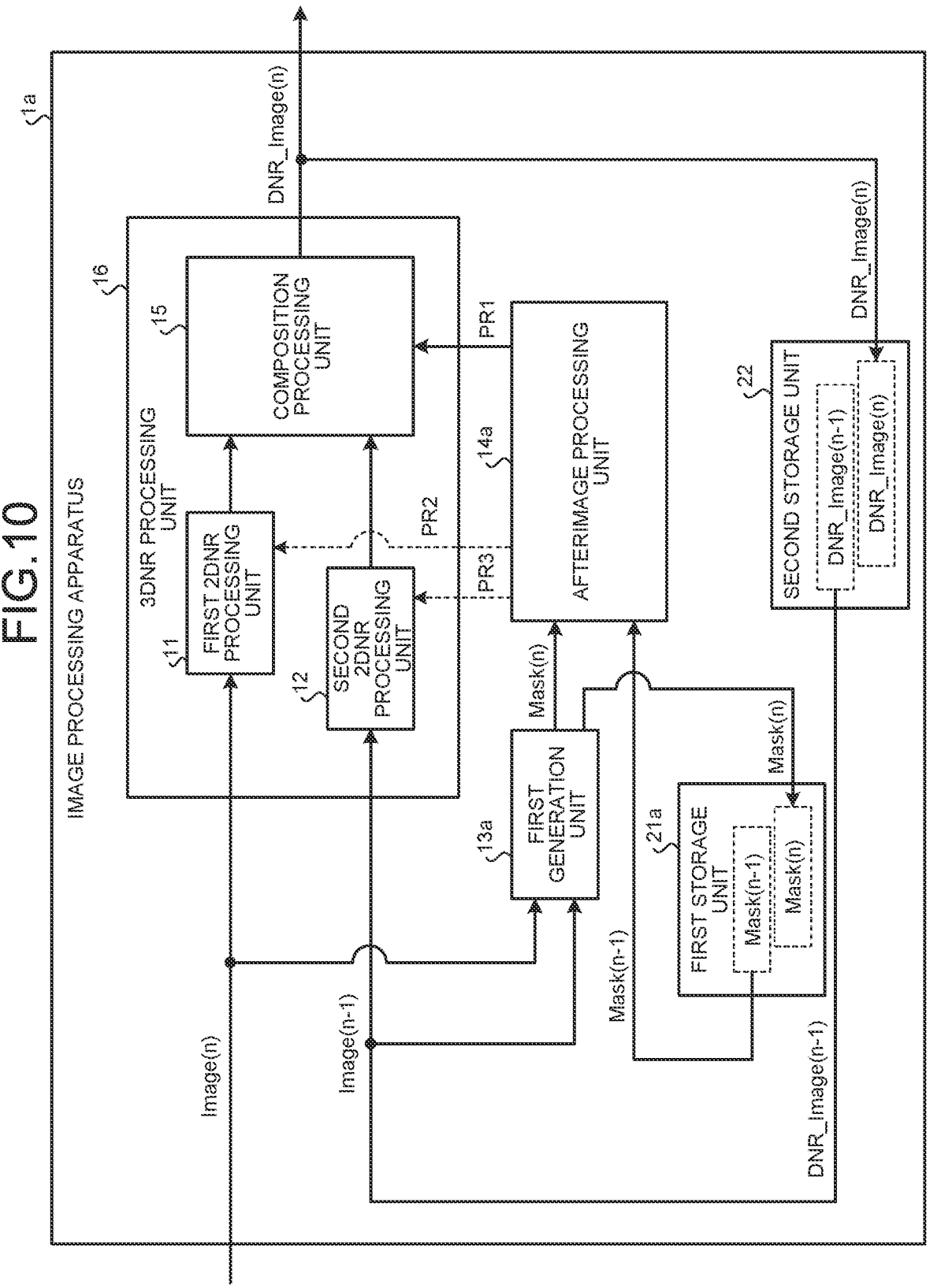
FIG. 10 is a diagram illustrating an example of a configuration of an image processing apparatus according to a second embodiment.

FIG. 10 is a diagram illustrating an example of a configuration of an image processing apparatus 1a according to the present embodiment. The image processing apparatus 1a includes: a first 2DNR processing unit 11, a second 2DNR processing unit 12, a first generation unit 13a, an afterimage processing unit 14a, and a composition processing unit 15. The image processing apparatus 1a further includes a first storage unit 21a, and a second storage unit 22.

Like the first generation unit 13, the first generation unit 13a generates the first motion map Mask(n) on the basis of the frame image Image(n) and the frame image Image(n−1). The generated first motion map Mask(n) is output to the afterimage processing unit 14a. Herein, the frame image Image(n−1) corresponds to the frame image DNR_Image(n−1) that is already subjected to the 3DNR processing and is related to the past frame that is one frame before, the frame image DNR_Image(n−1) being stored in the second storage unit 22.

In the present embodiment, upon detecting the frame image Image(n), the first generation unit 13a reads out the frame image DNR_Image(n−1) from the second storage unit 22. Note that the readout method of the frame image DNR_Image(n−1) is not limited to this. For example, the inside or outside of the image processing apparatus 1 may be provided with the input/output control unit (not illustrated) that collectively controls the input timing of the frame image Image(n), the readout timing of the frame image DNR_Image(n−1) from the second storage unit 22, and the like.

Moreover, the first generation unit 13a stores the generated first motion map Mask(n) in the first storage unit 21a. The first storage unit 21a has a capacity that allows storage of the first motion map, for example, for two frames, and enables readout of the stored first motion map in a first in first out (FIFO) method.

To the afterimage processing unit 14a, there are input: the first motion map Mask(n) related to the current frame; and the first motion map Mask(n−1) related to the past frame that is one frame before the current frame.

Specifically, upon detecting the first motion map Mask(n) from the first generation unit 13, the afterimage processing unit 14a reads out the first motion map Mask(n−1) from the first storage unit 21a. Note that a readout method of the first motion map Mask(n−1) is not limited to this. For example, the inside or outside of the image processing apparatus 1 may be provided with an input/output control unit (not illustrated) that collectively controls input timing of the first motion map Mask(n), readout timing of the first motion map Mask(n−1) from the first storage unit 21, and the like.

Figure 11:
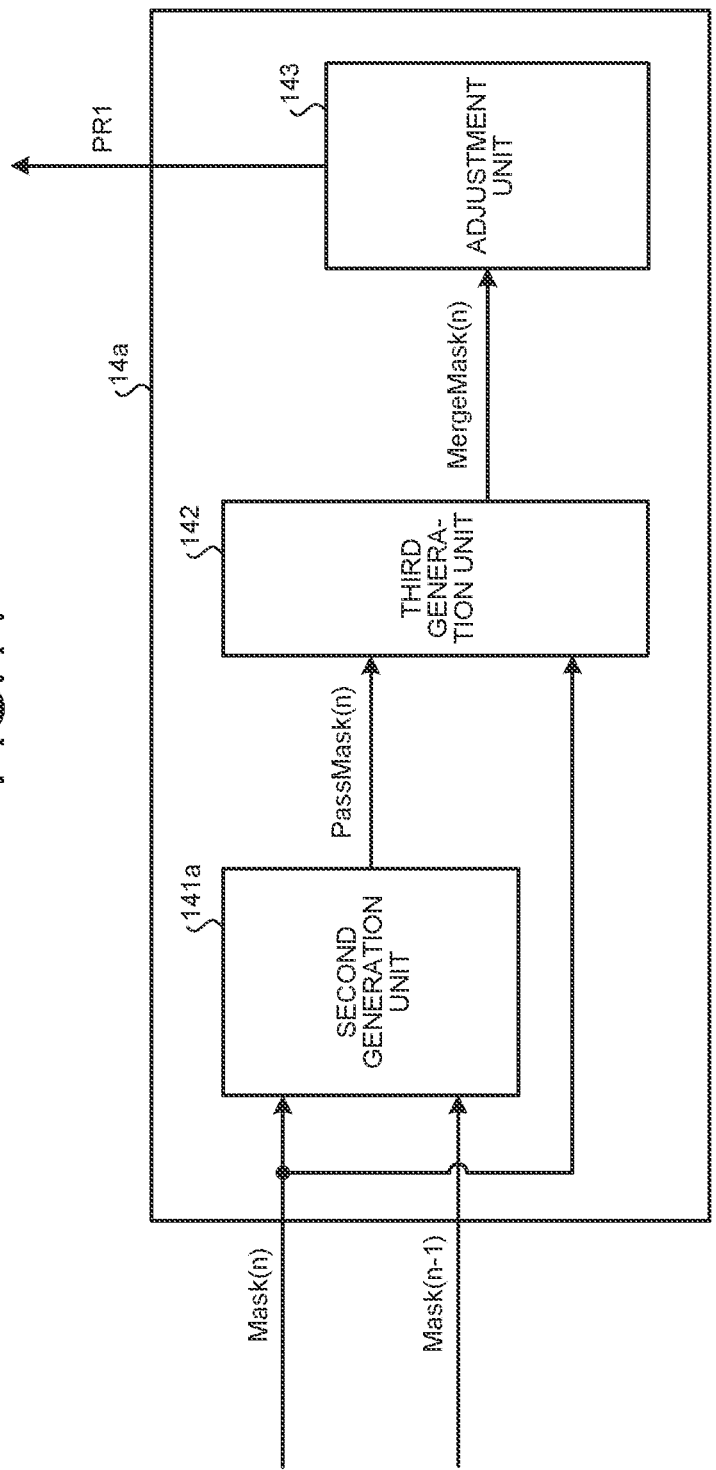
FIG. 11 is a diagram illustrating an example of functions of an afterimage processing unit of the second embodiment.

Herein, FIG. 11 is a diagram illustrating functions of the afterimage processing unit 14a. As illustrated in FIG. 11, the afterimage processing unit 14a includes a second generation unit 141a, a third generation unit 142, and an adjustment unit 143.

The second generation unit 141a subtracts the first motion map Mask(n) from the first motion map Mask(n−1), thereby generating a moving object passage map PassMask(n) that shows a moving object passage region through which the moving object has passed. Specifically, from values of the respective pixels which constitute the first motion map Mask(n−1), the second generation unit 141a subtracts values of the pixels of the first motion map Mask(n), which are located at the same pixel positions as those of these pixels. Then, the second generation unit 141a generates a moving object passage map PassMask(n) in which, with the respective pixel positions where such values as subtraction results become positive, values corresponding to the subtraction results are associated. Herein, binary values or multiple values of 8 bits and the like, which are values corresponding to the subtraction results, are associated with the respective pixels which constitute the moving object passage map PassMask(n).

Figure 12:
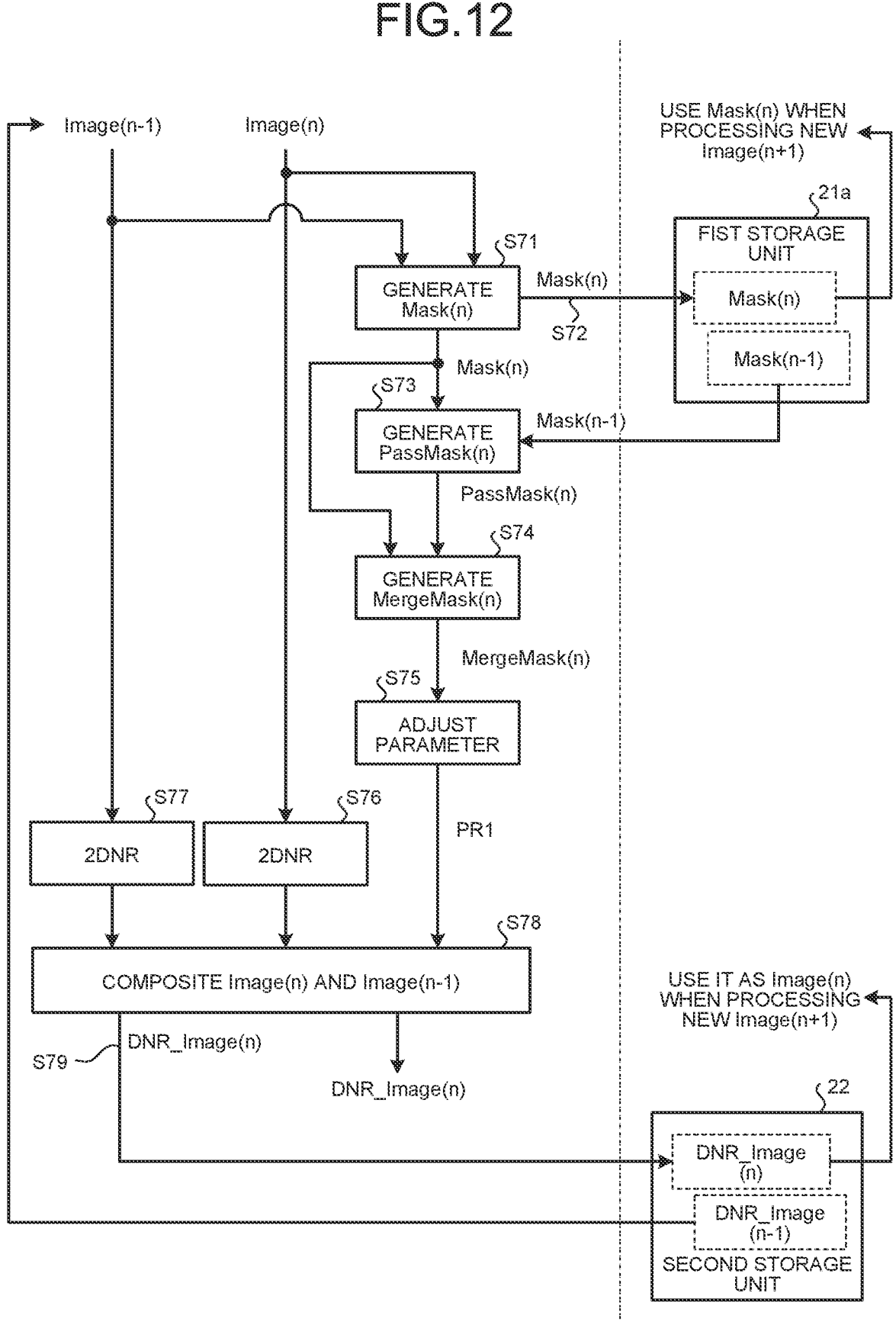
FIG. 12 is an explanatory diagram for explaining an overall operation of the image processing apparatus according to the second embodiment.

Next, referring to FIGS. 12 and 13, a description will be given of operations of the image processing apparatus 1 according to the present embodiment. Herein, FIG. 12 is an explanatory diagram for explaining an overall operation of the image processing apparatus 1. Further, FIG. 13 is an explanatory view for explaining operations of the first generation unit 13 and the afterimage processing unit 14.

Note that, in FIG. 12, in a left region divided by a broken line, illustrated are operations of the first 2DNR processing unit 11, the second 2DNR processing unit 12, the first generation unit 13a, the afterimage processing unit 14a, and the composition processing unit 15. Further, in a right region divided by the broken line, the first storage unit 21a and the second storage unit 22, which are illustrated in FIG. 10, are illustrated.

Figure 13:
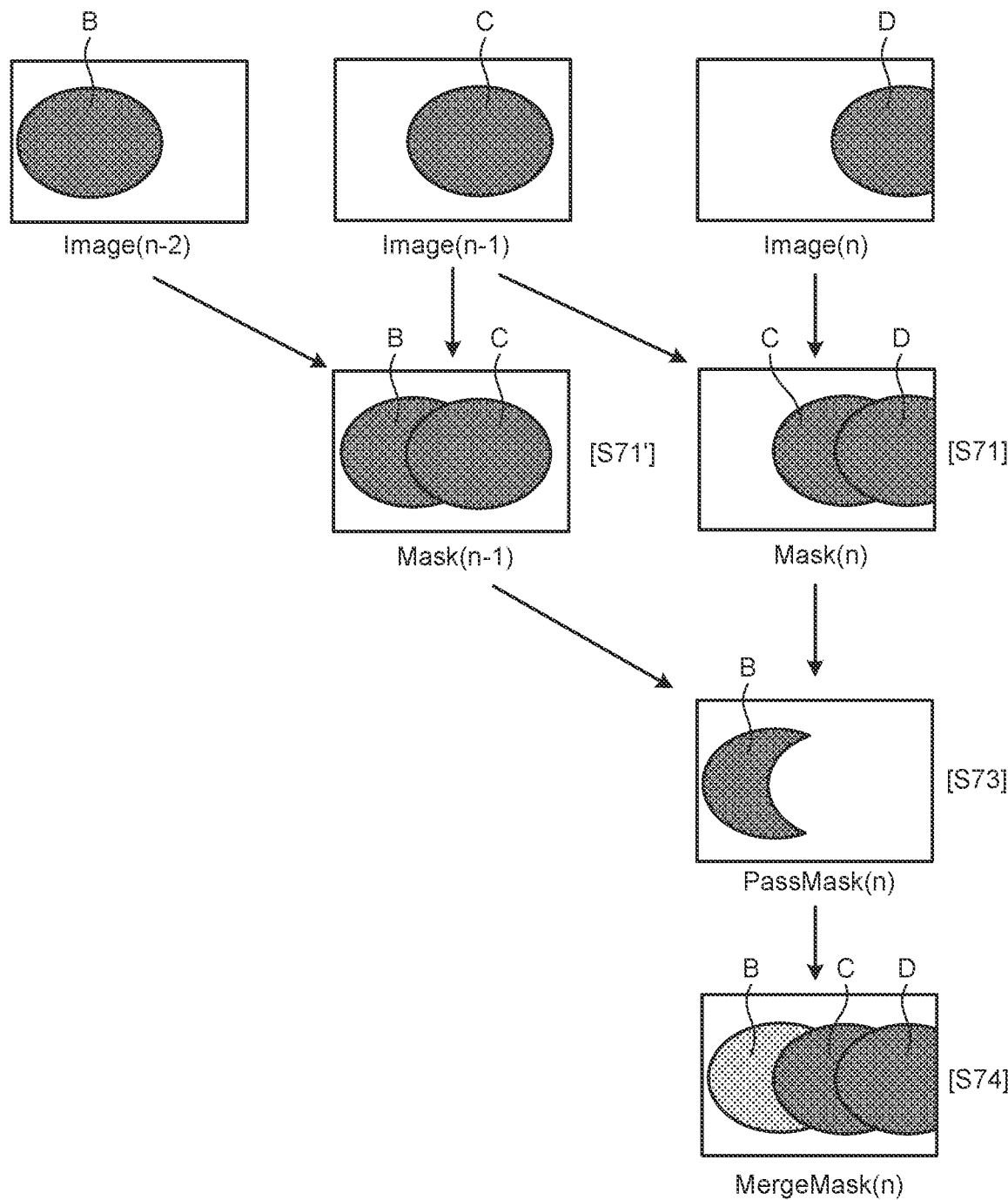
FIG. 13 is an explanatory view for explaining operations of a first generation unit and an afterimage processing unit according to the second embodiment.

Moreover, in FIG. 13, frame images Image(n−2) to Image(n) mean three frame images successive in chronological order. Further, hatched regions in the frame images mean positions where the moving object is present. Moreover, in FIGS. 12 and 13, for simplifying the explanation, it is assumed that, up to the stage of the past frame image Image(n−1) that is in one frame before the current frame, the 3DNR processing is already completed, that is, the first motion map Mask(n−1) and the frame image DNR_Image(n−1) already subjected to the 3DNR processing are already generated.

First, on the basis of the frame image Image(n) of the current frame and the past frame image Image(n−1) in one frame before the current frame, the first generation unit 13a generates the first motion map Mask(n) (Step S71). Herein, the frame image Image(n−1) in one frame before corresponds to the frame image DNR_Image(n−1) already subjected to the 3DNR processing.

Herein, as illustrated in FIG. 13, the first motion map Mask(n) becomes an image that represents such a moving object presence region where the moving object is present in both of the frame images which are the frame image Image(n) and the frame image Image(n−1).

Moreover, the first generation unit 13a stores the generated first motion map Mask(n) in the first storage unit 21a (Step S72). Thus, the first motion map Mask(n−1) stored first in the first storage unit 21a is input to the afterimage processing unit 14a.

Subsequently, from the first motion map Mask(n−1) that is related to the past frame that is one frame before and is stored in the first storage unit 21, the second generation unit 141a subtracts the first motion map Mask(n) related to the current frame, thereby generating the moving object passage map PassMask(n) (Step S73).

Herein, as illustrated in FIG. 13, the moving object passage map PassMask(n) becomes an image in which the presence region of the moving object, which is displayed on the first motion map Mask(n), is removed from the presence region of the moving object, which is displayed on the first motion map Mask(n−1). That is, on the moving object passage map PassMask(n), the presence region of the moving object, which is included in the frame image Image(n−2) before at least the frame image Image(n−1), will be displayed as the moving object passage region.

Subsequently, on the basis of the above-mentioned Equation (1), the third generation unit 142 merges the moving object passage map PassMask(n), which is multiplied by the afterimage suppression strength, with the first motion map Mask(n), thereby generating the second motion map MergeMask(n) related to the current frame (Step S74).

Thus, as illustrated in FIG. 13, the second motion map MergeMask(n) becomes an image in which the presence region of the moving object and the moving object passage region multiplied by the afterimage suppression strength are merged with each other. As in FIG. 5, in FIG. 13, a magnitude relationship in the motion information is represented by shades of hatching. Herein, the magnitude relationship in the motion information is established as: moving object B<moving object C=moving object D. Note that Steps S75 to S79 are similar to Steps S15 to S19 in FIG. 4, and accordingly, a description thereof will be omitted.

Figure 14:
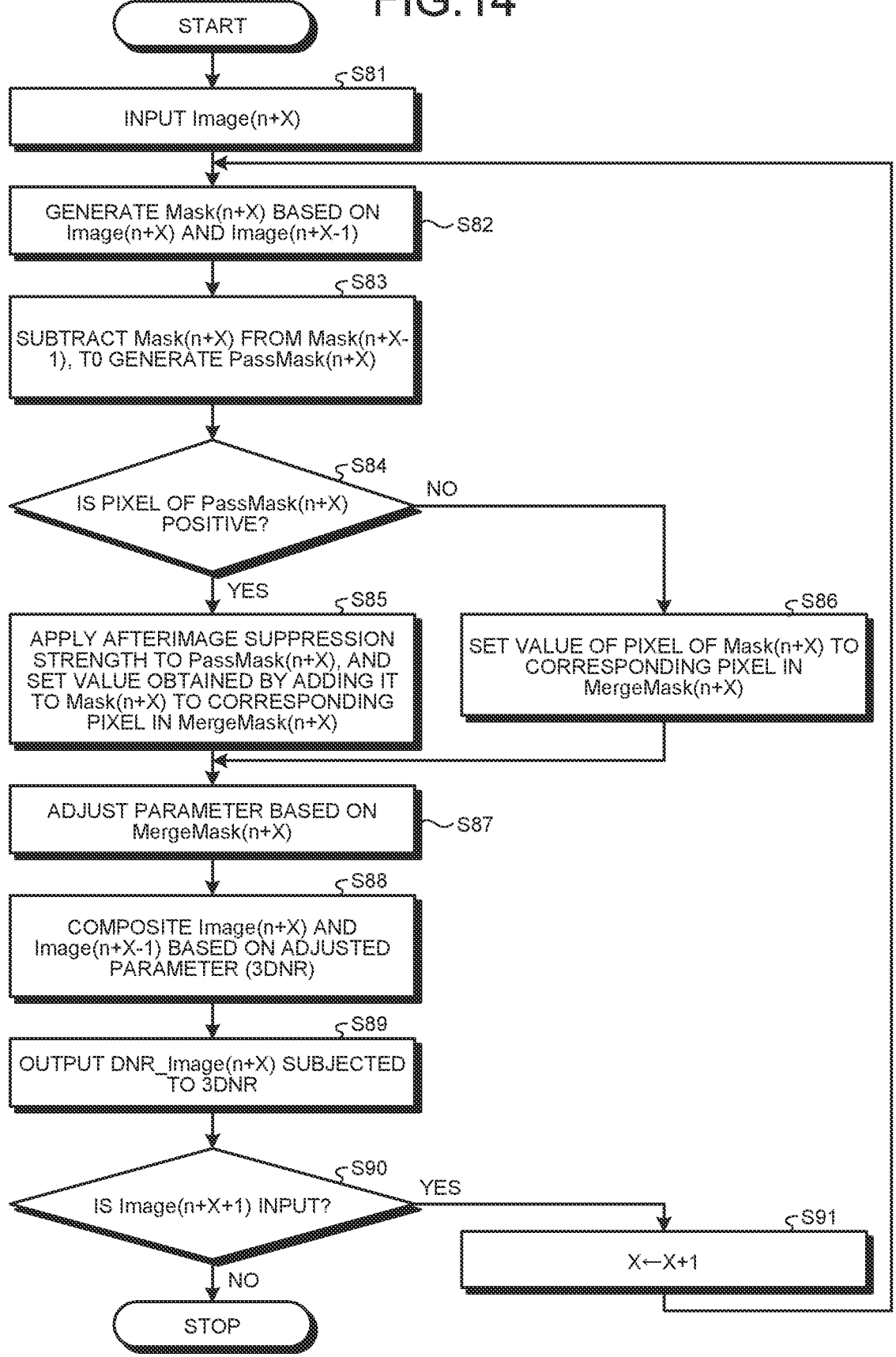
FIG. 14 is a flowchart illustrating an example of processing performed by the first generation unit, the afterimage processing unit and a composition processing unit in the second embodiment.

Next, referring to FIG. 14, a description will be given of a flow of processing performed by the first generation unit 13a, the afterimage processing unit 14a and the composition processing unit 15, which are mentioned above. FIG. 14 is a flowchart illustrating an example of the processing performed by the first generation unit 13a, the afterimage processing unit 14a and the composition processing unit 15. As in FIG. 6, in the present processing, a description will be given of operations in the case of using a latest frame image Image(n+X) as a base point and processing a future frame image to be input after this Image(n+X). Note that "X" is an integer.

First, upon detecting an input of the frame image Image (n+X) (Step S81), the first generation unit 13a generates a first motion map Mask(n+X) on the basis of the frame image Image(n+X) and a frame image Image(n+X−1) (Step S82). Herein, the frame image Image(n+X−1) corresponds to a frame image DNR_Image(n+X−1) stored in the second storage unit 22.

Subsequently, the second generation unit 141a subtracts the first motion map Mask(n+X) from a first motion map Mask(n+X−1), and generates a moving object passage map PassMask(n+X) that displays pixels in which results of the subtraction become positive (Step S83). Hereinafter, Steps S84 to S91 are similar to Steps S24 to S31 described in FIG. 6, and accordingly, a description thereof will be omitted.

As described above, the image processing apparatus 1a according to the present embodiment generates the first motion map Mask(n) from the frame image Image(n) and the frame image Image(n−1) for the latest two frames among the plurality of frame images which are successively input. Further, the image processing apparatus 1a subtracts the first motion map Mask(n) from the first motion map Mask(n−1) that shows the presence region of the moving object, which is included in the frame image before the frame image Image(n), thereby generating the moving object passage map PassMask(n). Further, the image processing apparatus 1a merges the moving object passage map PassMask(n) multiplied by the afterimage suppression strength and the first motion map Mask(n) with each other, and generates the second motion map MergeMask(n). Then, the image processing apparatus 1a adjusts the parameter PR1, which is related to the composition processing of the frame image Image(n) and the frame image Image(n−1), on the basis of the second motion map MergeMask(n).

Thus, the image processing apparatus 1a can change the composition ratio of the frame image Image(n) in the moving object passage region according to the parameter PR1, and accordingly, can reduce the afterimage noise that occurs in the moving object passage region. Hence, the image processing apparatus 1a can output the frame image (DNR_Image(n)) in which the afterimage noise is suppressed.

Further, the image processing apparatus 1a according to the present embodiment adjusts the parameter, which is related to the 3DNR processing, by using the first motion map, the moving object passage map and the second motion map, in each of which the bit depth is reduced, in comparison with the frame images. Thus, the image processing apparatus 1a can suppress the processing load and the memory usage, which are related to the adjustment of the parameter, and therefore, can enhance the efficiency of the processing.

Moreover, the image processing apparatus 1a according to the present embodiment can integrate and hold, into the second motion map, the presence positions of the moving object and the moving object passage regions, which are included in the frame images for three frames. Thus, for example, in comparison with a configuration of individually holding the frame images for three frames, the image processing apparatus 1 can reduce the memory capacity for use and the number of memories for use, and accordingly, can increase the processing efficiency.

In accordance with an aspect of the image processing apparatus disclosed by the present application, the noise that occurs in the region through which the moving object has passed can be reduced.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:
1. An image processing apparatus comprising
a hardware processor configured to function as:
a first generation unit that, from a first frame image and a second frame image among a plurality of frame images successively input, generates a first motion map showing a presence region of a moving object included in the frame images, the second frame image being in a past frame immediately successive to the first frame image in chronological order;
a second generation unit that generates a moving object passage map showing a moving object passage region through which the moving object has passed, by subtracting the first motion map from a past map image showing a presence region of the moving object included in a past frame image before the first frame image;

a third generation unit that generates a second motion map by integrating the first motion map and the moving object passage map multiplied by a first value; and an adjustment unit that, based on the second motion map, adjusts a parameter related to noise reduction processing of the first frame image and the second frame image.

2. The image processing apparatus according to claim 1, wherein the second generation unit subtracts, from values of pixels which constitute the past map image, values of pixels of the first motion map located at same pixel positions as the pixels which constitute the past map image, and generates the moving object passage map in which values corresponding to results of the subtraction are associated with pixel positions where values as the results of the subtraction are positive.

3. The image processing apparatus according to claim 2, wherein the third generation unit integrates the values of the pixels which constitute the first motion map and values obtained by multiplying, by the first value, values of pixels which constitute the moving object passage map, for respective pixel positions, to generate the second motion map, and based on values of pixels which constitute the second motion map, the adjustment unit adjusts the parameter related to the noise reduction processing in units of pixels.

4. The image processing apparatus according to claim 1, wherein every time when a new frame image is input, the second generation unit generates the moving object passage map by using, as the past map image, the first motion map generated for the preceding first frame image and second frame image.

5. The image processing apparatus according to claim 1, wherein every time when a new frame image is input, the second generation unit generates the moving object passage map by using, as the past map image, the second motion map generated for the preceding first frame image and second frame image.

6. The image processing apparatus according to claim 1, wherein the hardware processor is further configured to function as
a three-dimensional noise reduction processing unit that outputs a frame image for one frame from the first frame image and the second frame image by performing the noise reduction processing based on the parameter adjusted by the adjustment unit, when a new frame image is input, the first generation unit generates the first motion map by using, as a past frame image that is one frame before the new frame image, the frame image output by the three-dimensional noise reduction processing unit based on the preceding first frame image and second frame image.

7. The image processing apparatus according to claim 6, wherein the three-dimensional noise reduction processing unit includes:
a two-dimensional noise reduction processing unit that implements two-dimensional noise reduction processing on each of the first frame image and the second frame image; and a composition processing unit that composites the first frame image and the second frame image which are processed by the two-dimensional noise reduction processing unit, to output the frame image for one frame, and the adjustment unit adjusts a parameter related to an operation of the two-dimensional noise reduction processing unit or the composition processing unit.

8. The image processing apparatus according to claim 6, wherein the hardware processor is further configured to function as:
a motion amount estimation unit that, based on the first frame image and the second frame image, estimates a motion amount of a moving object included in both of the frame images; and a motion compensation unit that executes motion compensation processing for the second frame image by using an estimation result of the motion amount estimation unit, and according to whether or not a processing result of the motion compensation unit is input to the three-dimensional noise reduction processing unit, the third generation unit changes the first value by which the moving object passage map is multiplied.

9. The image processing apparatus according to claim 1, wherein a bit depth of the first motion map and the second motion map is reduced than a bit depth of the frame images.

10. An image processing method executed by a computer, comprising:

from a first frame image and a second frame image among a plurality of frame images successively input, generating a first motion map showing a presence region of a moving object included in the frame images, the second frame image being in a past frame immediately successive to the first frame image in chronological order;

generating a moving object passage map showing a moving object passage region through which the moving object has passed, by subtracting the first motion map from a past map image showing a presence region of the moving object included in a past frame image before the first frame image;

generating a second motion map by integrating the first motion map and the moving object passage map multiplied by a first value; and based on the second motion map, adjusting a parameter related to noise reduction processing of the first frame image and the second frame image.

11. A non-transitory computer-readable recording medium having stored therein a program for causing a computer to execute processing of:

from a first frame image and a second frame image among a plurality of frame images successively input, generating a first motion map showing a presence region of a moving object included in the frame images, and the second frame image being in a past frame immediately successive to the first frame image in chronological order;

generating a moving object passage map showing a moving object passage region through which the moving object has passed, by subtracting the first motion map from a past map image showing a presence region of the moving object included in a past frame image before the first frame image;

generating a second motion map by integrating the first motion map and the moving object passage map multiplied by a first value; and based on the second motion map, adjusting a parameter related to noise reduction processing of the first frame image and the second frame image.

* * * * *